United States Patent [19]
Kawakami et al.

[11] Patent Number: 6,051,340
[45] Date of Patent: *Apr. 18, 2000

[54] RECHARGEABLE LITHIUM BATTERY

[75] Inventors: Soichiro Kawakami; Shinya Mishina; Naoya Kobayashi, all of Nara; Masaya Asao, Kyoto, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,911

[22] Filed: Apr. 11, 1997

Related U.S. Application Data

[63] Continuation of application No. 08/453,392, May 30, 1995, abandoned.

[30] Foreign Application Priority Data

May 30, 1994 [JP] Japan ..................... 6-116717

[51] Int. Cl.[7] ..................................... H01M 2/20
[52] U.S. Cl. ................... 429/231.95; 429/223; 429/233; 429/220; 429/224; 429/235
[58] Field of Search ..................... 429/233, 218, 429/223, 224, 235, 231.95, 220, 226

[56] References Cited

U.S. PATENT DOCUMENTS

| | | | |
|---|---|---|---|
| 5,039,582 | 8/1991 | Pistoia | 429/218 |
| 5,162,178 | 11/1992 | Ohsawa et al. | 429/218 |
| 5,411,820 | 5/1995 | Choloner-Gill | 429/192 |
| 5,449,575 | 9/1995 | Moulton | 429/179 |

FOREIGN PATENT DOCUMENTS

| | | |
|---|---|---|
| 63-13264 | 1/1988 | Japan . |
| 63-114057 | 5/1988 | Japan . |
| 63264865 | 2/1989 | Japan . |
| 5-47381 | 2/1993 | Japan . |
| 5190171 | 7/1993 | Japan . |
| 5234585 | 9/1993 | Japan . |
| 93-190171 | 9/1993 | Japan . |

OTHER PUBLICATIONS

Journal Of Applied Electrochemistry, N. Kumagai et al., Jun. 18, 1991, pp. 620–627, "Cycling Behaviour of Lithium–Aluminium Alloys Formed on Various Aluminium Substrates as Negative Electrodes in Secondary Lithium Cells".

*Primary Examiner*—Maria Nuzzolillo
*Assistant Examiner*—Monique Wills
*Attorney, Agent, or Firm*—Fitzpatrick, Cella, Harper & Scinto

[57] ABSTRACT

A rechargeable lithium cell comprising an anode, a separator, a cathode, and an electrolyte or an electrolyte solution, characterized in that said anode comprises (a) a metal capable of being alloyed with lithium and (b) a metal incapable of being alloyed with lithium, said anode contains lithium when charging is operated, and wherein an anode terminal is extended from a portion formed of said metal (b).

27 Claims, 8 Drawing Sheets

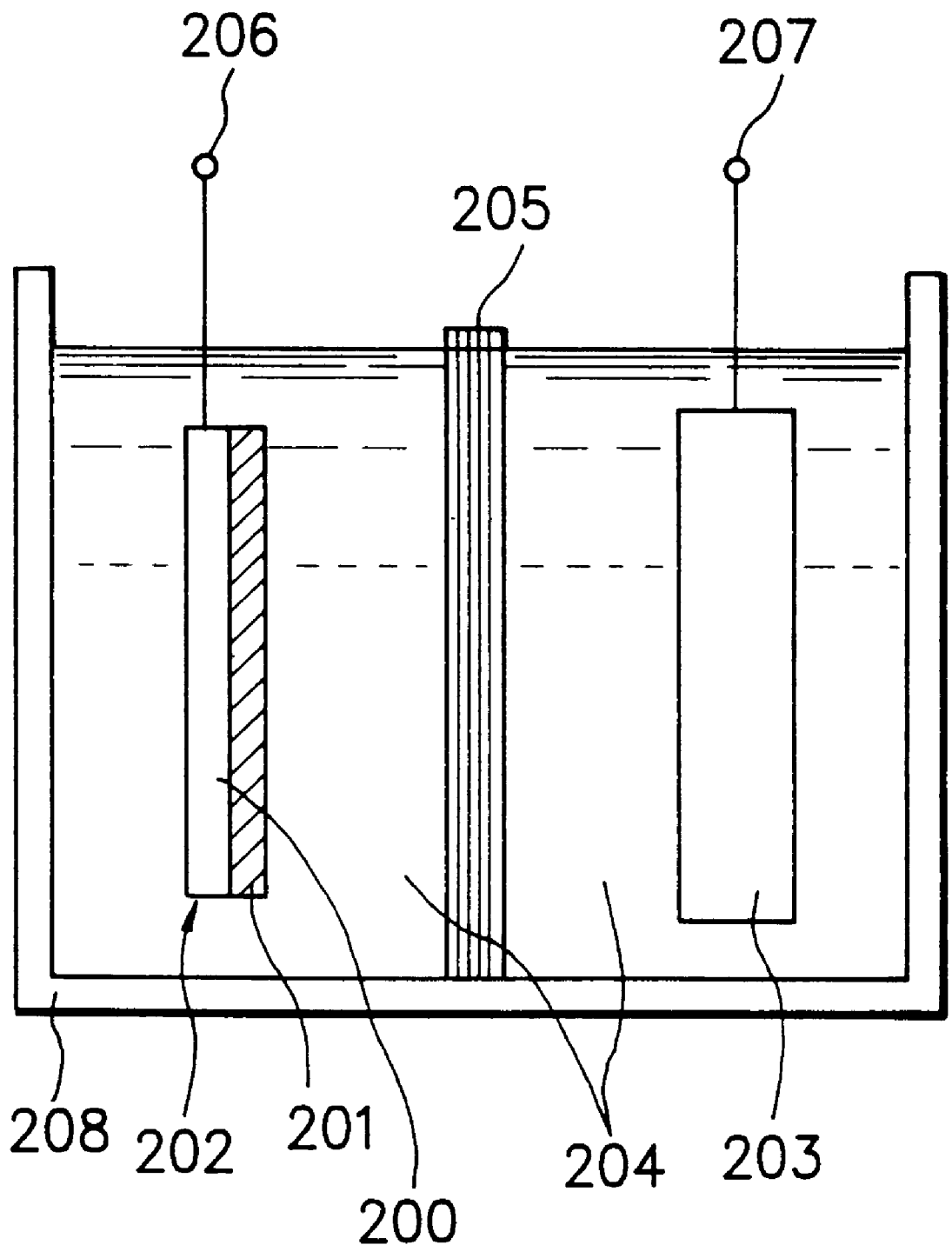

RECHARGEABLE LITHIUM BATTERY

This application is continuation of application Ser. No. 08/453,392 filed May 30, 1995, now abandoned.

BACKGROUND OF THE INVENTION

1. Field of the Invention

The present invention relates to an improved rechargeable lithium battery with a specific anode formed of lithium. More particularly, the present invention relates to an improved rechargeable lithium battery which exhibits an excellent current collecting performance and is free of occurrence of a dendrite (or a branched tree-like protrusion) of lithium upon repetition of charging and discharging.

2. Related Background Art

In recent years, heating of the earth because of the so-called greenhouse effect due to an increase of atmospheric $CO_2$ has been predicted In the case of the steam-power generation, the amount of a fossil fuel represented by coal or petroleum to be consumed for power generation in order to comply with a societal demand for increased power supply has been continuously increased and along with this, the amount of exhaust fumes from the steam-power generation plants has been continuously increased accordingly to raise the content of gases to cause a greenhouse effect such as carbon dioxide gas in the air. This results in providing an earth-warming phenomenon. In order to prevent said earth-warming phenomenon from further developing, there is a practice of prohibiting to establishment of a steam-power generation plant in some countries.

Under these circumstances, there has been made a proposal of conducting so-called load leveling in order to effectively utilize the power generator, wherein rechargeable batteries are installed at general houses and a surplus power unused in the night. That is, a so-called dump power, is stored in said rechargeable batteries and the power thus stored is supplied in the daytime when the power demand is increased, whereby the power generator is leveled in terms of the load therefor.

By the way, there is an increased societal demand for developing a lightweight rechargeable battery with a high energy density for an electric vehicle which does not exhaust any air polluting substance such as $CO_x$, $NO_x$, $SO_x$, hydrocarbon, and the like. Other than this demand, there are increased societal demands for developing a miniature, lightweight, high performance rechargeable battery usable as a power source for potable instruments such as small personal computers, word processors, video cameras, and pocket telephones.

As such rechargeable battery, there has been proposed a rocking chair type lithium ion rechargeable battery in which a lithium intercalation compound is used as an cathode active material and carbon is used as a anode active material. However, as of the present time, there has not been realized a practical usable lithium ion rechargeable battery having a sufficiently high energy density, which is considered could be attained by using a metallic lithium as the anode active material.

The public attention has now focused on the rechargeable lithium battery in which metallic lithium is used as an anode, but as of the present time, there has not yet been attained a practically usable, high capacity rechargeable lithium battery with an improved energy density Particularly, as for the known rechargeable lithium battery, there is a problem in that lithium is often deposited in a dendritic state (that is, in the form of a dendrite) on the negative electrode (or the anode) upon the charging operation, wherein such dendritic deposition of lithium metal results in causing internal-shorts or self-discharge. As one of the reasons why such practically usable, high capacity rechargeable lithium battery as above described has not been realized, in the absence of means capable of preventing the occurrence of the above dendritic lithium deposition has not been developed Now, as above described, once the above lithium dendrite is formed, the dendrite is liable to gradually grow upon the charging, resulting in causing internal-shorts between the anode and the cathode. When the anode suffers from internal-shorts with the cathode as above described, the energy possessed by the battery is shortly consumed at the short-circuited portion to entail problems such that the battery is heated or the solvent of the electrolyte is decomposed by virtue of heat to generate gas, resulting in raising the inner pressure of the battery. These problems result in damaging the battery or/and shortening the lifetime of the battery.

There has been proposed a manner of using a lithium alloy such as lithium-aluminum alloy as the anode for a rechargeable lithium battery in order to suppress the reactivity of the lithium so that a lithium dendrite is hardly generated. This manner is effective in preventing the generation of the lithium dendrite but is not effective in attaining a rechargeable lithium battery having a high energy density and which is long enough in cycle life.

Particularly, Japanese Unexamined Patent Publication No. 13264/1988 (hereinafter referred to as document 1), No. 47381/1993 (hereinafter referred to as document 2) or No. 190171/1993 (hereinafter referred to as document 3) discloses a non-aqueous series rechargeable battery in which the anode is constituted by a lithium alloy. However, any of the rechargeable batteries disclosed in these documents 1 to 3 is problematic in that as the charging and discharging are repeated, the anode is repeatedly expanded and shrunk to often suffer from a crack, wherein the rechargeable battery eventually becomes poor in current collecting performance.

Additionally, Japanese Unexamined Patent Publication No. 114057/1988 (hereinafter referred to as document 4) discloses a non-aqueous series rechargeable battery in which the anode is constituted by a basic constituent comprising a sintered body of a mixture composed of fibrous aluminum and fibrous metal incapable of being alloyed with lithium and a negative material comprising a lithium-aluminum alloy. However, the rechargeable battery disclosed in the document 4 is problematic in that as the charging and discharging are alternately repeated over a long period of time, expansion and shrinkage are liable to repeatedly occur at the fibrous aluminum to deteriorate its adhesion with the fibrous metal incapable of being alloyed with lithium or to cause a crack at the interface between the fibrous aluminum and the fibrous metal, wherein the rechargeable battery eventually becomes poor in current collecting performance Further, Japanese Unexamined Patent Publication No. 234585/1993 (hereinafter referred to as document 5) discloses a non-aqueous series rechargeable battery in which the anode is constituted by a member made of lithium metal having powdery metal (which hardly forms an intermetallic compound with said lithium metal) uniformly deposited on the surface thereof. As for this rechargeable battery, the document 5 describes that it is slight in terms of the generation of a dendrite, high in charging and discharging efficiencies, and long in cycle life. However, the rechargeable battery disclosed in the document 5 is still problematic in that as the charging and discharging are alternately repeated, expansion and shrinkage are liable to repeatedly occur at the lithium metal member and as a result, the powdery metal deposited on the lithium metal member is often removed or a crack often occurs at the lithium metal member, resulting in making it difficult to sufficiently prevent the occurrence of a dendrite and also in making the rechargeable battery to be poor in current collecting performance.

Further in addition, *Journal of Applied Electrochemistry*, 22, 620–627 (1992) (hereinafter referred to as document 6) discloses a rechargeable lithium battery in which the anode (or the negative electrode) is constituted by an aluminum foil having a surface applied with etching treatment. However, the rechargeable lithium battery disclosed in the document 6 is problematic in that when the charging and discharging cycle is repeated as many as that practically conducted for the ordinary rechargeable battery, problems are liable to arise in that as the charging and discharging are alternately repeated, the aluminum foil is repeatedly expanded and shrunk to suffer from a crack, resulting in causing a reduction in the current collecting performance, wherein the growth of a dendrite is liable to occur.

Hence, any one of the rechargeable batteries disclosed in the documents 1 to 6 is still accompanied by some problems required to be solved.

Accordingly, there is an increased demand for provision of an improved rechargeable lithium battery which is high in energy density and long enough in cycle life.

SUMMARY OF THE INVENTION

A principal object of the present invention is to eliminate the foregoing problems found in the known rechargeable lithium batteries and to provide an improved rechargeable lithium battery which is free of such problems.

Another object of the present invention is to provide a highly reliable rechargeable lithium battery which is high in energy density and long enough in cycle life.

A further object of the present invention is to provide a rechargeable lithium battery having an improved anode structured such the anode is always free from not only a problem of causing dendritic deposition of lithium metal and lithium dissolution but also a problem of suffering from a crack even when the charging and discharging are alternately repeated over a long period of time, and it makes the battery to stably exhibit an excellent current collecting performance without being deteriorated A further object of the present invention is to provide a secondary lithium cell comprising an aode, a separator, a cathode, an electrolyte or an electrolyte solution, and an insulating housing characterized in that said anode comprises (a) a metal capable of being alloyed with lithium and (b) a metal incapable of forming an alloy with lithium, said anode contains lithium when charging is operated, and wherein an anode outputting terminal is extended from an anode collector portion formed of said metal (b).

BRIEF DESCRIPTION OF THE DRAWINGS

FIG. 5 is a schematic diagram illustrating the constitution of an example of a rechargeable lithium battery according to the present invention.

DESCRIPTION OF THE INVENTION AND PREFERRED EMBODIMENTS

Figure 1:
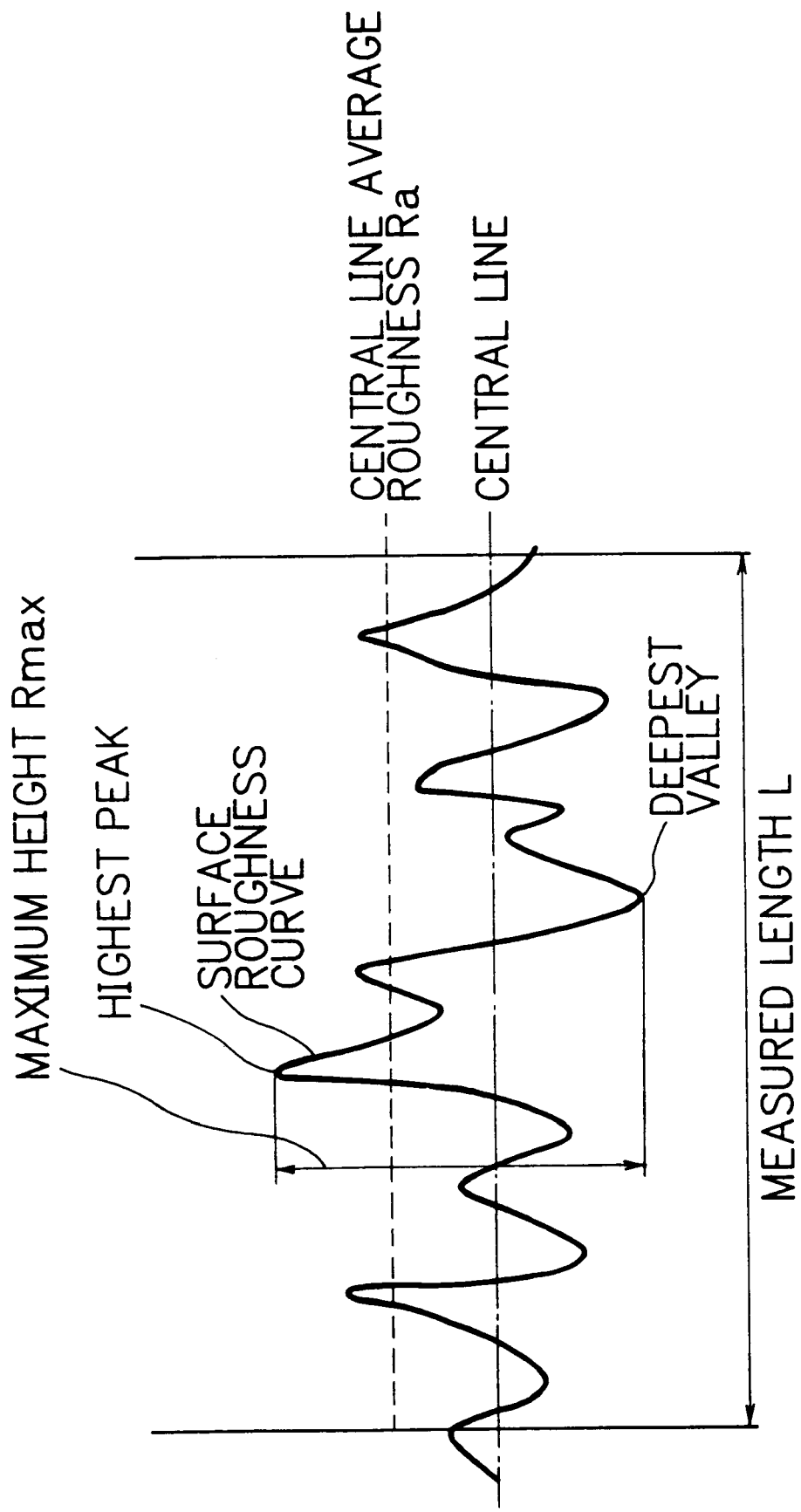
FIG. 1 is a graph showing measured results for the surface of an anode for a rechargeable lithium battery by means of the tracer method, which were obtained as a result of the experimental studies by the present inventors.

The present invention is to eliminate the foregoing problems found in the known rechargeable lithium battery and to attain the above described objects.

The present invention has been accomplished based on a finding obtained through experimental studies by the present inventors that when an anode constituted by a composite material comprising a metal capable of being alloyed with lithium and another metal incapable of being alloyed with lithium is properly used, there can be attained an improved rechargeable lithium battery which is free of the generation of a dendrite which is found in the known rechargeable lithium battery, and which has a prolonged cycle life.

A typical embodiment of the rechargeable lithium battery according to the present invention comprises an anode, a separator, a cathode, an electrolyte or an electrolyte solution, and a housing, characterized in that said anode comprises (a) a metal capable of being alloyed with lithium and (b) a metal incapable of being alloyed with lithium, said anode contains lithium when charging is operated, and wherein an outputting terminal on the side of said anode is extended from a portion formed of said metal (b). Particularly, in the secondary lithium cell according to the present invention, the anode is designed to have a collector portion comprised of a metal incapable of being alloyed with lithium. Because of this, the anode is always free from occurrence of the deposition or elution of lithium resulting in causing a crack at the anode upon repetition of the charging and discharging cycle, wherein the anode is always maintained in a stable state without being broken into fine particles. This situation makes the rechargeable battery to stably exhibit an excellent current collecting performance without being deteriorated.

In the present invention, it is desired for the anode to be designed such that the content of the metal incapable of forming an alloy with lithium is enhanced not only at the surface thereof which is contacted with the electrolyte or electrolyte solution and which is opposed to the cathode but also at the collector portion in contact with the power outputting terminal.

Now, in a rechargeable lithium battery in which the anode comprises a metal capable of being alloyed with lithium, there is a tendency for the anode to entail problems such that upon the charging, lithium is deposited to form an alloy wherein the anode is expanded and upon the discharging, lithium is eluted into the electrolyte solution wherein the anode is shrunk, whereby a crack is occurred at the anode to break part of the anode into fine particles (this situation will be hereinafter referred to as "powdering"). This powdering is most actively occurred at the anode's highly reactive surface where a metal capable of being alloyed with lithium is present. The portion wherein the powdering has occurred is of a reduced conductivity and poor in the current collecting performance.

However, in the case where a metal incapable of being alloyed with lithium is incorporated at an enhanced content in the anode's surface which is contacted with the electrolyte solution and which is opposed to the cathode, a sufficient conductivity is maintained at the anode electrode through said metal incapable of being alloyed with lithium and because of this, the anode is prevented from being reduced in terms of the current collecting performance, even when the powdering occurs at a certain magnitude.

In the present present invention, the anode comprising a metal (a) capable of being alloyed with lithium and a metal (b) incapable of being alloyed with lithium may be a composite formed by fixing a powdery material containing a metal capable of being alloyed with lithium to a material comprised of a metal incapable of being alloyed with lithium which can serve as an anode collector using a binding agent. Alternatively, the anode may be a sintered body obtained by subjecting said composite to sintering treatment. In any case, by constituting the anode for a rechargeable lithium battery by said composite or said sintered body, there are provided various advantages as will be described in the following. That is, first, the anode is free of the occurrence of a crack resulting in breaking the anode, which will be caused when the expansion due to the formation of an alloy with lithium upon operating the charging and the shrinkage due to the elution of lithium upon operating the discharging are repeatedly occurring. And, since the powdery material is used for the formation of the anode, an increase can be attained for the specific surface area of the anode wherein the area of the anode to be contacted with the electrolyte solution is increased, and this situation makes lithium ion to be readily diffused into the anode. Further, the specific surface area of the anode can be increased by way of the etching treatment for the surface of the anode formed as above described, wherein advantages are provided in that a dendritic deposition of lithium is prevented from growing upon the charging, and both the charging efficiency and discharging efficiency are improved. Further in addition, the thickness of the anode, the content of each of the metals (a) capable of being alloyed with lithium and the metal (b) incapable of being alloyed with lithium in the anode may be easily controlled as desired.

Now, in the case where the anode comprises a composite formed by fixing a powdery material (i) containing a metal capable of being alloyed with lithium to a material (ii) comprised of a metal incapable of being alloyed with lithium which can be served as an anode collector (or an anode current collector) using a binding agent wherein the composite is not subjected to sintering treatment, it is necessary for the powdery material (i) to be incorporated with an electrically conductive auxiliary such as powdery carbon or powdery metal in an amount of 1 to 25 wt. % so that the respective particles of the powdery material (i) possess an increased current collecting property. The powdery carbon or powdery metal as the electrically conductive auxiliary is desired to be of a small bulk density, wherein the anode becomes such that readily holds the electrolyte solution and has a reduced impedance. Specifically, the electrically conductive auxiliary is desired to be of a bulk density of 0.1 or less.

As for the powdery carbon or powdery metal as the electrically conductive auxiliary, the smaller the mean particle size is, the more the effect is improved.

In order to attain a desirable packing density while attaining a desirable current collecting property, it is desired to together use an electrically conductive auxiliary comprising a carbon or metal in the form of a sphere, acicular or flake shape.

In the case where the anode comprises a sintered body obtained by subjecting the above described composite to sintering treatment, it is desired to use, as the binding agent, an inorganic material or an organic material which hardly generates a corrosive gas such as halogen gas under high temperature condition. Specific examples of such organic material are, for example, high-molecular compounds which can be readily carbonized. The sintering treatment is desired to be conducted under reduced pressure or in the presence of inert gas or reducing gas.

Alternatively, it is possible for the anode to comprise an alloy of a metal capable of being alloyed with lithium and other metal incapable of being alloyed with lithium. In this case, an improvement is attained for the anode in that not only the exterior but also the inside is provided with a desirable current collecting property and the anode has a prolonged charging and discharging cycle life.

As for the foregoing material (i) containing a metal capable of being alloyed with lithium for the anode, it may comprise an alloy of two or more different metals each having a different etching speed and capable of being selectively etched. In this case, by subjecting the anode to selective etching treatment, the anode can be made such that it has a markedly increased specific surface area.

In any case, in the present invention, it is desired to make the anode to have a large specific surface area by subjecting the foregoing constituent metal (a) capable of being alloyed with lithium or the foregoing constituent metal (b) incapable of being alloyed with lithium to selective etching treatment. In the case where the specific surface area of the anode is increased in this way, there are provided pronounced advantages in that the reactivity of the surface of the anode is increased to provide a reduction in the substantive current density, the charge and discharge reactions are made such that they effectively take place, and the cycle life is prolonged.

In the case where protrusions are present at the surface of the anode which is provided with a plurality of irregularities such that it has an increased specific surface area, electric fields are centralized at the protrusions to provide an increase in the current density, resulting in a problem in that the growth of a dendrite of lithium often occurs to cause internal-shorts between the anode and the cathode.

In order to prevent occurrence of this problem, it is desired for the anode to be designed such that the difference between (i) a height corresponding to a ½ of the maximum height Rmax (that is, a distance between the tip of the highest peak and the bottom point of the deepest valley) for the surface roughness of the electrically conductive material at the anode's surface which is contacted with the electrolyte solution and is opposed to the cathode and (ii) a central line average roughness Ra is $1/10$ or less of the distance between the anode's surface and the cathode's surface. A pronounced effect is provided when the ratio of the electrical conductivity of the tip portion at the anode's surface (roughened surface) to the electrical conductivity of the valley portion at said anode's surface is 10 or less.

Even if the above difference should be greater than 1/10 of the distance between the anode's surface and the cathode's surface, as long as the protrusions have an electrical resistance which is greater than that possessed by the flat portions, no electric line of force is centralized at the protrusions wherein the field intensity is not increased, and therefore, the growth of a dendrite of lithium does not occur at the protrusions when the charging is operated.

Now, shown in FIG. 1 is an indication standard for the surface roughness of a material (see, M. Kinoshita, at al, Collection of Surface Polishing and Finishing Techniques, p.p. 217–219, published by Nikkei Gijitsu Tosho Kabushiki Kaisha, May 20, 1984). The present inventors made studies through experiments in order to examine the relationship between the surface roughness of a given material for the anode for a rechargeable lithium battery and the cycle life of the anode while referring to the indication standard shown in FIG. 1. That is, there were provided aluminum foils and copper foils each having a different surface roughness. As for the surface of each of these metal foils, the maximum height Rmax and the central line roughness Ra, which are described in FIG. 1, were measured by means of the tracer method. Using these metal foils, there were prepared a plurality of rechargeable lithium batteries by the conventional manner, wherein their anodes were formed using the aluminum foils or copper foils, and their cathodes were formed by applying a coating composition obtained by mixing lithium cobalt oxide ($LiCoO_2$), acetylene black, and polyvinylidene fluoride onto the surface of the aluminum foil. Then, as for each of the resultant rechargeable lithium batteries, the charging and discharging were alternately repeated many times, wherein the charging was operated under conditions of readily causing the growth of a dendrite of lithium, and the charging and discharging cycle life of the rechargeable battery was examined. The examined results obtained are graphically shown in FIG. 2, in relation to values obtained by the equation: (the maximum height of the surface irregularities of the electrical conductive material at the anode's surface opposite the cathode)/2—a central line average roughness/a distance between the anode's surface and the cathode's surface.

Figure 2:
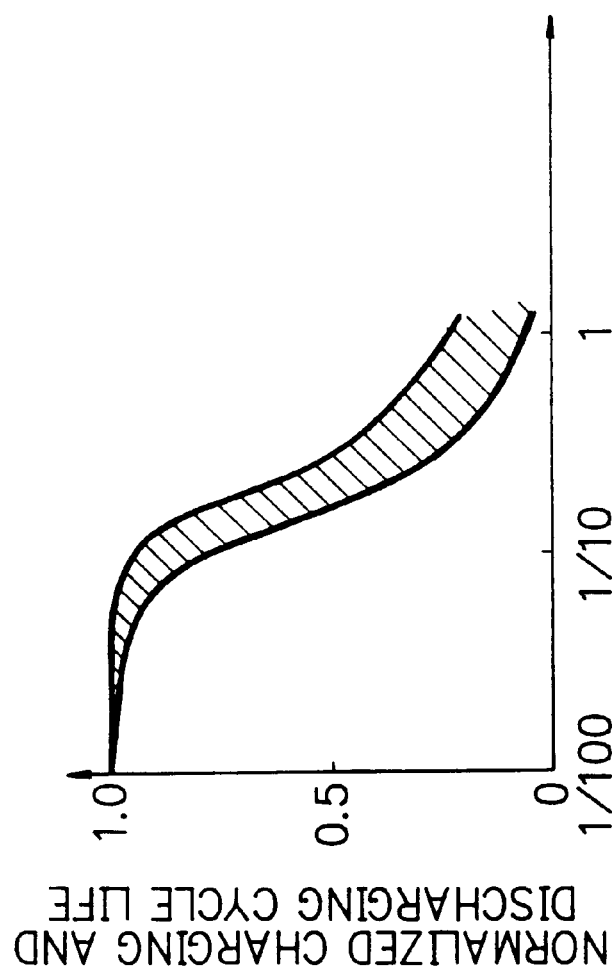
FIG. 2 is a known graph showing a typical relationship between (a) a difference between a height corresponding to a ½ of the maximum height Rmax for the surface roughness of an electrically conductive material disposed on the surface of an anode and a central line average roughness Ra for said surface roughness and (b) a given cycle life for the anode.

From the results shown in FIG. 2, there were obtained findings. That is, there can be established a certain interrelation among (i) the difference between a value corresponding to a ½ of the maximum height Rmax of the surface irregularities of the electrical conductive material at the anode's surface opposite the cathode and the central line average roughness Ra for the surface irregularities at the anode's surface and (ii) the cycle life (that is, the charging and discharging cycle life) of the anode. And the cycle life of the anode is prolonged when the difference between a value obtained by the equation: [(the maximum height of the surface irregularities of the electrical conductive material at the anode's surface opposite the cathode)—(the minimum height of said irregularities)]×½ and the central line average roughness of said irregularities is made to be 1/10 or less of the distance between the anode's surface and the cathode's surface.

In addition, there was obtained a further finding as for the surface roughness of the electrically conductive material at the surface of the anode. That is, it is desired for the electrically conductive material at the surface of the anode to have a surface roughness satisfying the equation: $1+(4nRa/L) \geq 1.05$, with Ra being a central line average roughness, L being a length measured, and n being the number of peaks present per the length L.

Separately, the present inventors made studies of whether or not an improvement can be attained in the charging and discharging life of the anode for a rechargeable lithium battery by increasing the reactivity of the surface of the anode. That is, there were prepared a plurality of rechargeable lithium batteries by the conventional manner, wherein the anode of each rechargeable lithium battery was formed using an anode active material comprising aluminum as the metal capable of being alloyed with lithium and the resultant anode was subjected to etching treatment to roughen the surface thereof so as to have a different surface roughness in each case, the cathode thereof was formed using a cathode active material comprising lithium nickel oxide, and as the electrolyte solution, there was used an electrolyte solution obtained by dissolving lithium borofluoride in a mined solvent of EC-DMC (ethylene carbonate-dimethyl carbonate) or PC-DEC (propylene carbonate-diethyl carbonate). As for each of the resultant rechargeable lithium batteries, the charging and discharging cycle life of the rechargeable battery was examined in the same manner as in the above The examined results obtained are graphically shown in FIG. 3, in relation to values obtained by the equation: the equation: $1+(4nRa/L)$, with Ra being a central line average roughness, L being a length measured, and n being the number of peaks present per the length L.

Figure 3:
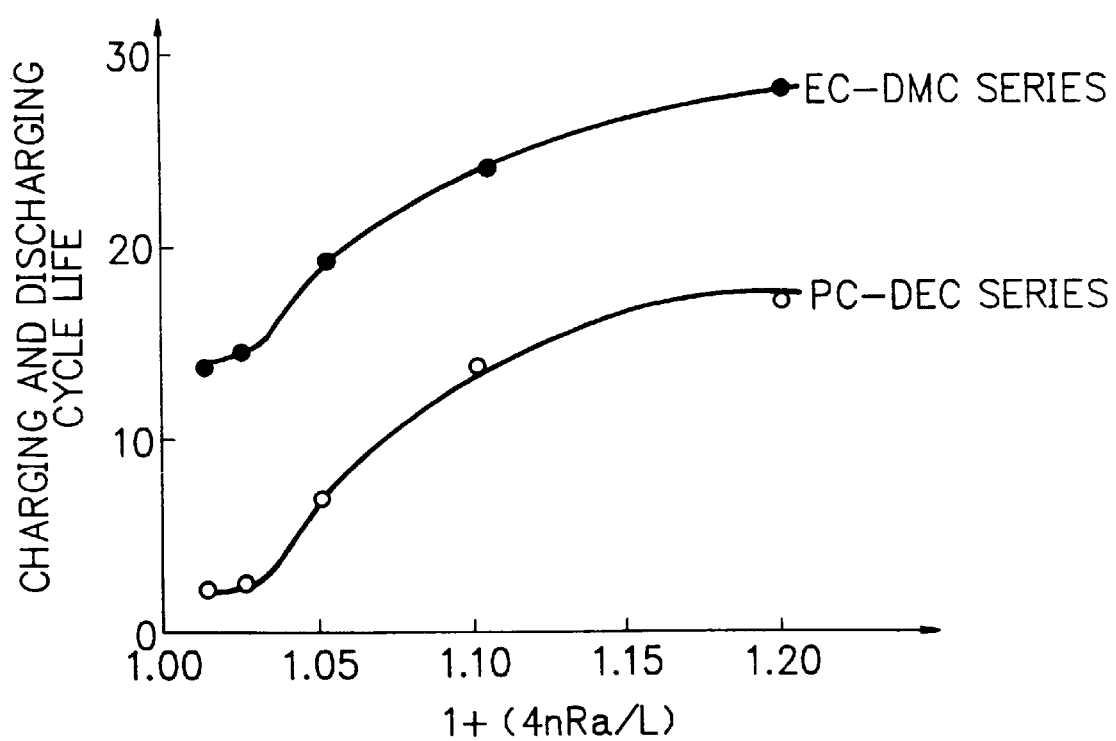
FIG. 3 is a graph showing typical relationships between a value of the equation: 1+ (4nRa/L) (with Ra being a central line average roughness, L being a length measured, and n being the number of peaks present per the length L) and the cycle life of a given anode for a rechargeable lithium battery, which were obtained as a result of the experimental studies by the present inventors.

Based on the results shown in FIG. 3, there was obtained a finding in that when the surface of the anode is roughened by the etching treatment, not only the reactivity of the anode's surface is increased but also the specific surface area thereof is increased, and as a result, the charging and discharging cycle life is prolonged accordingly. Particularly, as apparent from FIG. 3, it was found that when the surface of the anode is made such that the value obtained by the above equation is 1.05 or more, preferably 1.10 or more, more preferably 1.20 or more, the charging and discharging cycle life of the anode can be extended to be two times or more that of an anode having not subjected to surface roughening treatment.

In the present invention, the anode may have a current collecting portion provided with an electrical conductor layer which is higher than the metal capable of forming an alloy with lithium in terms of the coefficient of extension at room temperature.

In the case where either a lithium-aluminum foil or an aluminum foil is used for the anode, when the charging and discharging are repeated many times, there is a tendency of entailing a problem in that a crack occur at the anode, resulting in breaking the anode to deteriorate the current collecting performance. This problem is considered to occur mainly due to expansion and shrinkage of the anode which are occur when the charging and discharging cycle is repeatedly conducted many times. However, this problem can be prevented from occurring by disposing the foregoing electrical conductor layer at the anode.

In the present invention, the cathode active material for the cathode may contain lithium. In this case, a deposition of lithium occurs the first time when the charging is operated, wherein the lithium thus deposited causes the formation of an alloy with the metal capable of being alloyed with lithium which is contained in the anode. The incorporation of the lithium into the cathode active material provides a pronounced advantage in that it is not necessary to have a lithium alloy in advance prior to assembling a rechargeable lithium battery, the production process of the rechargeable lithium battery can be simplified. In addition to this advantage, there is provided another advantage in that since the lithium contained in the cathode releases therefrom and enters thereinto upon the repetition of the charging and discharging cycle, the cathode is hardly expanded or shrunk when the charging and discharging are repeated, wherein there is no occasion for the cathode active material to be removed, resulting in prolonging the charging and discharging cycle life.

In the present invention, it is possible for the surface of the anode to be covered by an insulating film or a semiconductor film having a property of allowing lithium ion to pass through but prohibiting a lithium metal deposited upon the charging to pass through. In this case, the lithium deposited is prevented from directly contacting with the electrolyte solution. And in general, a reaction product produced as a result of the reaction of an active lithium often is liable not to contribute to the charging, but the active lithium is prevented from producing such reaction product. As a result, the charging and discharging cycle life is prolonged. Further, in this case, when the anode is formed of a powdery material, the foregoing surface coat prevents occurrence of a removal at the surface of the anode.

In the following, the present invention will be described while referring to FIGS. 4(a) through 4(h).

FIGS. 4(a) through 4(h) are schematic cross-sectional views respectively illustrating an embodiment of an anode usable in a rechargeable lithium battery according to the present invention.

The rechargeable lithium battery according to the present invention comprises an anode shown in any of FIGS. 4(a) through 4(h), and a cathode and a separator disposed above the anode such that they are opposite to the anode (not shown in the figures).

Figure 4A:
FIGS. 4(*a*) through 4(*h*) are schematic cross-sectional views respectively for explaining an example of an anode for a rechargeable lithium battery according to the present invention.

FIG. 4(a) indicates an anode comprising a member 102 constituted by a material containing a metal capable of being alloyed with lithium and a metal layer 101 as a collector portion, comprised of a metal incapable of being alloyed with lithium. In the case of the anode shown in FIG. 4(a), upon operating the charging, lithium ion contained in the electrolyte solution is reacted with the metal capable of being alloyed with lithium contained in the member 102 to cause a deposit in the form of an alloy, wherein the anode is expanded. Then, upon the discharging, lithium ion is released from the member 102 into the electrolyte solution, wherein the anode is shrunk. Due to the expansion and shrinkage occurred upon conducting the charging and discharging cycle, part of the member 102 often suffers from occurrence of a crack resulting in breaking apart of the member into fine particles (this situation will be hereinafter referred to as powdering). But problems which will be caused by the powdering can be eliminated by the metal layer 101. That is, the metal layer 101 comprised of the metal incapable of being alloyed with lithium as the collector portion which is disposed next to the member 101 serves not only to prevent the current collecting performance from being reduced but also to prevent the member 102 from releasing its constituent into the electrolyte solution.

Figure 4B:
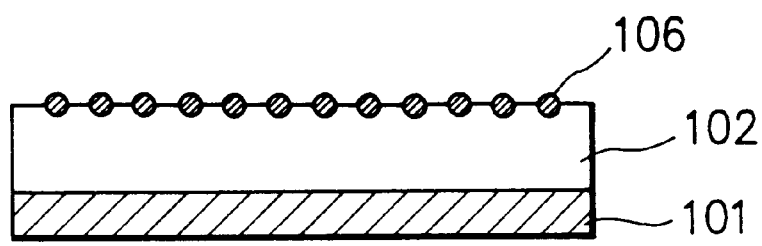

The anode shown in FIG. 4(b) is a modification of the anode shown in FIG. 4(a) in which a plurality of small metallic materials 106 incapable of being alloyed with lithium are spacedly arranged on the surface of the anode shown in FIG. 4(a). The anode shown in FIG. 4(b) provides, in addition to the advantages provided by the anode shown in FIG. 4(a), a further advantage in that the small metallic materials 106 serve not only to prevent the anode's surface, which is most liable to readily break whereby causing the powdering, from causing a reduction in the current collecting performance in the plane direction but also to prevent the anode's surface from suffering from the powdering.

Figure 4C:
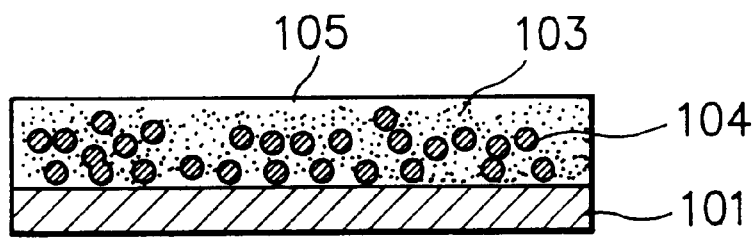

The anode shown in FIG. 4(c) comprises a metal layer 101 comprised of a metal incapable of being alloyed with lithium as a current collecting portion and an active layer comprised of a mixture composed of a powdery material 103 containing a metal capable of being alloyed with lithium, an electrically conductive auxiliary 104 and a binding agent 105, wherein said active layer is fixed on the metal layer 101 by means of the binding agent 105.

The anode shown in FIG. 4(c) provides advantages in that since the member containing the metal capable of being alloyed with lithium is formed using the powdery material, a stress which will be caused due to the expansion and shrinkage occurred upon conducting the charging and discharging cycle is desirably relaxed to prevent the anode from suffering from fatigue failure, and because of this, the charging and discharging cycle life is prolonged; and the area to be contacted with the electrolyte solution is increased to facilitate the reactions upon the charging and discharging to smoothly proceed.

Figure 4D:
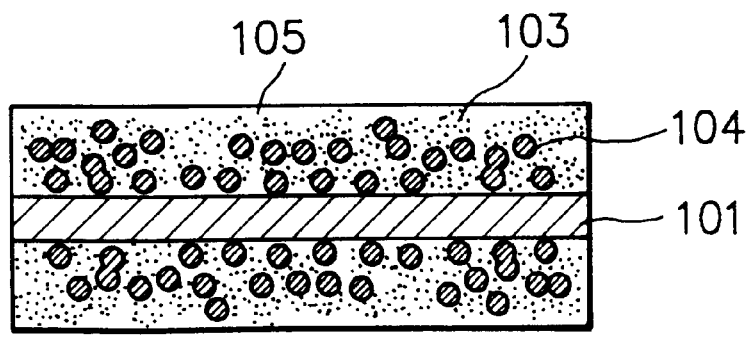

Shown in FIG. 4(d) is a modification of the configuration shown in FIG. 4(c), in which an additional active layer, which is the same as the active layer in the case of the anode shown in FIG. 4(c), is fixed to the remaining side of the metal layer 101 in the configuration shown in FIG. 4(c). In the case of using the anode shown in FIG. 4(d), a separator and a cathode may be arranged on each of the opposite sides of the anode.

The anode shown in FIG. 4(d) is very effectively usable in the production of a spiral cylindrical type battery or a rectangular battery for the stacked type electrode, wherein there can be attained simplification for the production process, saving for the materials to be used, and an increase in the capacitance per a unit volume.

Figure 4E:
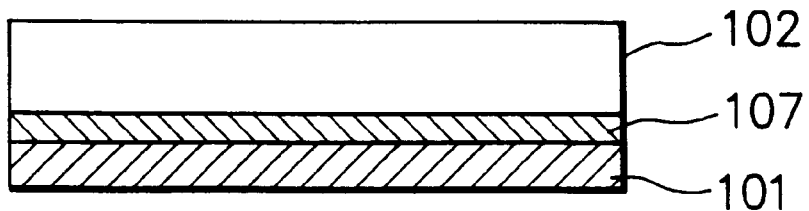

Shown in FIG. 4(e) is a modification of the configuration shown in FIG. 4(a), in which an electrically conductive layer 107 having a high coefficient of extension is interposed between the metal layer 101 as the collector portion and the member 102 of the configuration shown in FIG. 4(a). The anode shown in FIG. 4(e) provides advantages in that when the member 102 constituted by the material containing the metal capable of being alloyed with lithium is expanded and shrunk to suffer from occurrence of a crack of causing the powdering upon conducting the charging and discharging cycle, the electrically conductive layer 107 effectively follows said expansion and shrinkage to prevent the anode from deteriorating in terms of the current collecting performance; and the member 102 is prevented from releasing its constituent into the electrolyte solution.

Figure 4F:
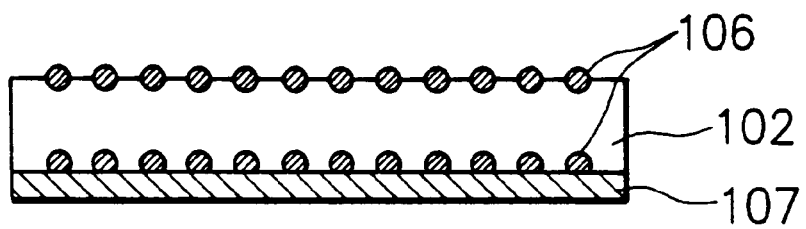

The anode shown in FIG. 4(f) comprises a member 102 constituted by a material containing a metal capable being alloyed with lithium having a surface provided with a plurality of small metallic materials 106 spacedly arranged at said surface and a rear face provided with a plurality of small metallic materials 106 spacedly arranged at said rear face, and an electrically conductive layer 107 having a high coefficient of extension which is disposed so as to cover the rear face of the member 102, wherein the rear face of the member 102, which is provided with said plurality of small metallic materials 106, serves as collector portion. The anode shown in FIG. 4(f) provides advantages in that when the member 102 is expanded and shrunk to suffer from occurrence of a crack of causing the powdering upon conducting the charging and discharging cyle, the electrically conductive layer 107 effectively follows said expansion and shrinkage to prevent the anode from deteriorating in terms of the current collecting performance; and the member 102 is prevented from releasing its constituent into the electrolyte solution.

Figure 4G:
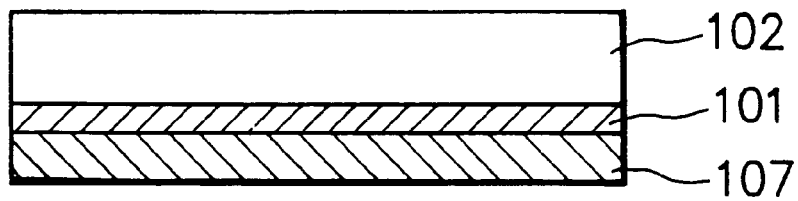

Shown in FIG. 4(g) is a modification of the configuration shown in FIG. 4(a), in which an electrically conductive layer 107 having a high coefficient of extension is disposed so as to cover the remaining face of the metal layer 101 as the collector portion of the configuration shown in FIG. 4(a). The anode shown in FIG. 4(g) provides advantages in that the current collecting performance of the metal layer 101 is effectively prevented from being deteriorated and the member 102 is prevented from releasing its constituent into the electrolyte solution.

Figure 4H:
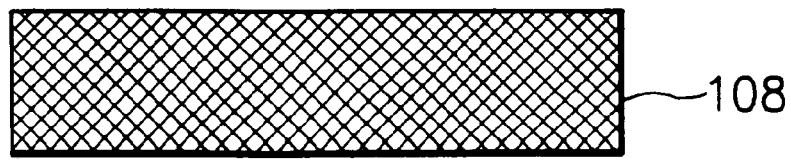

The anode shown in FIG. 4(h) comprises an alloy 108 comprised of (a) a metal capable of being alloyed with lithium and (b) a metal incapable of being alloyed with lithium. The anode shown in FIG. 4(h) provides advantages in that it is possible for the metal (b) to be uniformly dispersed in the anode so that the anode always exhibits a desirable current collecting performance and there is no occasion for the anode to suffer from occurrence of a crack causing the powdering.

As for the alloy for the anode shown in FIG. 4(h), it is desired to contain the metal (a) in an amount of 50 wt. % or more in order to attain a sufficient utilization efficiency for lithium Further, as for the alloy for the anode shown in FIG. 4(h), when the metal (a) and the metal (b) are different from each other in terms of the etching rate, selective etching can be conducted for the alloy, wherein by removing a part of either the metal (a) or the metal (b) by the selective etching, there can be attained a remarkably high specific surface area for the cathode.

Using any of the anodes shown in FIGS. 4(a) through 4(g), an appropriate cathode, an appropriate separator, and an appropriate electrolyte solution, there can be produced a rechargeable lithium battery according to the present invention, having such a configuration as shown in FIG. 5. In FIG. 5, reference numeral 202 indicates an anode comprising a collector portion 200 comprised of a metallic material incapable of being alloyed with lithium and a layer 201 comprised of a material containing a metal capable of being alloyed principally with lithium, reference numeral 203 a cathode, reference numeral 204 an electrolyte solution, reference numeral 205 a separator, reference numeral 206 an anode terminal, reference numeral 207 a cathode terminal, and reference numeral 208 a cell jacket. In this configuration, the anode 202 comprises any of the anodes shown in FIGS. 4(a) through 4(g).

As apparent from the foregoing description, the rechargeable lithium battery according to the present invention is provided with a specific anode comprising a specific member comprised of a material containing a metal capable of being alloyed with lithium and a specific collector portion comprised of a metallic material incapable of being alloyed with lithium, and because of this, the rechargeable lithium battery according to the present invention has pronounced advantages in that a desirable current collecting performance is always stably exhibited without the collector portion being deteriorated even when charging and discharging are alternately repeated over a long period of time, wherein the charging voltage upon the constant-current charging is effectively prevented from rising, a dendrite of lithium is effectively prevented from generating at the anode, and the charging and discharging cycle life of the anode is remarkably prolonged.

In the following, description will be made of the rechargeable lithium battery according to the present invention and the production thereof.

ANODE

The anode disposed in a rechargeable lithium battery according to the present invention comprises at least a member comprised of a material containing a metal capable of being alloyed with lithium and a collector portion having a metal incapable of being alloyed with lithium, wherein an anode outputting terminal is extended from said collector portion.

In the present invention, the anode may take any of the configurations shown in FIGS. 4(a) through 4(h). Specifically, in a typical embodiment, the anode comprises a metallic material capable of being alloyed with lithium arranged on a plate-like or foil-like material containing a metal incapable of being alloyed with lithium which is capable of serving as an anode collector portion. In another typical embodiment, the anode comprises a layer formed of a powdery material containing a metal capable of being alloyed with lithium which is disposed on a metallic material incapable of being alloyed with lithium which is capable of serving as an anode collector portion. Any of these two anodes may be provided with a plurality of small metallic materials incapable of being alloyed with lithium such that they are spacedly arranged on the surface of the anode which is opposed to the cathode, in order to attain an improved current collecting performance.

Alternatively, in any of the above two typical embodiments, either the metallic material capable of being alloyed with lithium or the layer formed of a powdery material containing a metal capable of being alloyed with lithium may be replaced by an alloy composed of a metal capable of being alloyed with lithium and a metal incapable of being alloyed with lithium Further, the anode may be provided with a layer composed of an electrically conductive material, which exhibits a coefficient of extension which is greater than that of the metal capable of being alloyed with lithium at room temperature, such that said electrically conductive layer covers the collector portion, in order to prevent the anode from suffering from fatigue failure due to the expansion and shrinkage occurred when the charging and discharging are alternatively repeated.

Description will be made of a manner of arranging a metallic material incapable of being alloyed with lithium (hereinafter referred to as arranging metal material) on an anode constituting member comprised of a metal capable of being alloyed with lithium (hereinafter referred to as anode base member).

To arrange the arranging metal material either on a face of the anode base member to be situated to oppose the cathode or on a face thereof to be a collector portion may be conducted in the following manner.

In the case where the metal capable of being alloyed with lithium (this metal will be hereinafter referred to as alloyable metal for the simplification purpose) has an ionization tendency which is higher than that of the metal incapable of being alloyed with lithium (this metal will be hereinafter referred to as non-alloyable metal for the simplification purpose), a member comprised of the alloyable metal is immersed in a solution of a salt of the non-alloyable metal. By this, part of the alloyable metal constituting said member can be substituted by the non-alloyable metal. The substituting amount may be controlled as desired by properly adjusting the time during which the member is immersed in the above solution, the content of the metal salt in the solution, or the temperature of the solution. Particularly, as the time during which the member is immersed in the above solution is prolonged, the substituting amount is increased accordingly. Similarly, as the content of the metal salt in the solution is increased or the temperature of the solution is heightened, the substituting amount is increased.

Alternatively, to arrange the arranging metal material either a face of the anode base member to be situated to oppose the cathode or a face thereof to be a collector portion may be conducted by means of electro plating, non-electro (or chemical) plating, laser plating, sputtering, resistance heating evaporation, electron beam evaporation, cluster-ion beam evaporation, thermal-induced CVD, low pressure CVD, plasma CVD, or laser CVD, wherein a layer of the non-alloyable metal is deposited on the anode base member. Other than these, it may employ a manner of applying an ink or paste containing the non-alloyable metal on the anode base member by means of the screen printing process.

Other than the above manners, it is possible to employ the following manner. That is, a member comprised of the non-alloyable metal capable of serving as an anode collector portion is provided, and on this member, a layer comprised of the alloyable metal is formed by means of sputtering, resistance heating evaporation, electron beam evaporation, cluster-ion beam evaporation, thermal-induced CVD, low pressure CVD, plasma CVD, or a coating process such as screen printing process.

The member comprised of the non-alloyable metal in this case may be shaped in a plate-like form, foil-like form, punching metal form, expanded metal form, or mesh form.

Specific examples of the alloyable metal (that is, the metal capable of being alloyed with lithium) are Al, Mg, K, Na, Ca, Sr, Ba, Si, Ge, Sb, Pb, In, and Zn. Of these, Al, Mg, Ca and Pb are most appropriate.

Specific examples of the non-alloyable metal (that is, the metal incapable of being alloyed with lithium) are Ni, Ti, Cu, Ag, Au, Pt, Fe, Co, Cr, W, and Mo. Of these, Ni, Ti, Cu, Pt, and Fe are most appropriate. In order for the member comprised of the non-alloyable metal to function as the anode collector, it is a matter of course that the member may contain one of these metals.

Alternatively, the member may comprise an alloy of two or more of these metals. Further, the member may comprise of stainless steel.

Description will be made of the anode having a layer formed of a powdery material containing the alloyable metal.

The formation of the layer comprised of a powdery material containing the alloyable metal (that is, the metal capable of being alloyed with lithium) on the member comprised of the non-alloyable metal (that is, the metal incapable of being alloyed with lithium) serving as the collector portion (hereinafter referred to as collector member) may be conducted, for example, in the following manner. That is, a powdery material containing the alloyable metal or a powdery material of an alloy composed of the alloyable metal (that is, the metal capable of being alloyed with lithium) and the non-alloyable metal (that is, the metal incapable of being alloyed with lithium) is firstly provided. Any of these powdery materials is well mixed with a resin or a low fusion point glass as a binding agent. The resultant is well mixed with an organic solvent to obtain a paste having a predetermined viscosity. The paste thus obtained is applied on the collector member, followed by subjecting to drying or sintering treatment.

The resin (that is, the binder resin) is desired to be a resin which is stable for the electrolyte solution.

Specific examples of such binder resin are polytetrafluoroethylene, polyvinylidene fluoride, polyethylene, polypropylene, ethylene-propylene copolymer, ethylene-propylene-diethane polymer, and silicone resin. Other than these, polymers capable of being highly crosslinked are also usable.

In the case where these binder resins are selectively used as the binding agent, there is a tendency that the current collecting performance is gradually decreased as the charging and discharging are alternately repeated, although the active material is slightly released. In order to prevent occurrence of this problem, it is desired to incorporate an appropriate electrically conductive auxiliary into any of the foregoing powdery materials. By this, an improvement can attained for the powdery material layer.

Such electrically conductive auxiliary can include carbon blacks such as KETJEN BLACK (trademark name) and acetylene black, and graphite in a powdery form. Of these, graphite is the most appropriate. Particularly in the case where flake-like graphite having a form of being large in the direction parallel to the crystal plane and being small in the direction perpendicular to the crystal plane and having a bulk density of 0.1 or less is used as the electrically conductive auxiliary, pronounced advantages are provided in that because the flake-like graphite is high in electrical conductivity, an improved current collecting performance is attained while providing an improvement in the retention of the electrolyte solution, and a reduction is attained for the anode comprised of the powdery material in terms of the impedance.

As for the foregoing collector member, it is necessary for the surface thereof to be composed of an electrically conductive material comprised of the non-alloyable metal.

The collector member may be shaped in a plate-like form, foil-like form, mesh form, porous form-like sponge form, punching metal form, or expanded metal form.

Specific examples of the non-alloyable metal (that is, the metal incapable of being alloyed with lithium) by which the collector member is constituted are Ni, Cu, Ti, Cu, Al, Ag, Au, Pt, Fe, or stainless steel.

Description will be made of the electrically conductive layer having a high coefficient of extension.

The electrically conductive layer having a high coefficient of extension may be formed by means of sputtering, resistance heating evaporation, electron beam evaporation, cluster-ion beam evaporation, thermal-induced CVD, low pressure CVD, plasma CVD, laser CVD, electro plating, non-electro (or chemical) plating, or laser plating. Other than these, it may employ a manner of applying an ink containing a given electrically conductive material having a high coefficient of extensionthe by means of the screen printing process.

The electrically conductive layer having a high coefficient of extension may be formed of a metal or alloy such as Sn, Sn-Bi alloy, Sn-Pb alloy, Zn-Al alloy, Cu-Zn alloy, or Cd-Zn alloy. If necessary, the electrically conductive layer may be formed of a metal or alloy selected from Au, Ag, Al, and alloys of these metals. Further, the electrically conductive layer may be formed of an electrically conductive ink comprising a mixture of fine particles of an electrically conductive material and an organic polymer material as a binding agent. In this case, the electrically conductive layer is usually formed by means of the screen printing process.

The above organic polymer material contained in the electrically conductive ink can include fluorine-containing resin, polyollefine, silicone resin, and other polymers capable of being highly crosslinked. In a preferred embodiment, the above organic polymer material as the binding agent is desired to be such that the glass transition temperature thereof is less than the lowest temperature of the temperature range practically used, specifically, it is −30° C. or less for example.

Description will be made of the case where the surface of the anode is made to have an increased surface area by subjecting the surface of the anode to etching treatment.

As above described, the anode comprising a member comprised of a material containing the alloyable metal (that is, the metal capable of being alloyed with lithium) and a collector member comprised of the non-alloyable metal (that is, the metal incapable of being alloyed with lithium) according to the present invention can be made to have an increased surface area by subjecting the surface of the anode to etching treatment The etching treatment in this case may be conducted by way of chemical etching, electrochemical etching, or plasma etching.

The chemical etching is conducted in a manner wherein the surface of an object is etched by reacting it with an etching-solution of an acid or alkali.

As the acid usable for etching a member comprised of Al as the alloyable metal (that is, the metal capable of being alloyed with lithium), there can be mentioned phosphoric acid, sulfuric acid, hydrochloric acid, nitric acid, acetic acid, hydrofluoric acid and mixtures of two or more of these. Similarly, as the alkali, there can be mentioned potassium hydroxide, sodium hydroxide, lithium hydroxide, and mixtures of two or more of these.

As the etching solution usable for etching a member comprised of Mg as the alloyable metal, there can be mentioned solutions of one or more acids selected from nitric acid, sulfuric acid and hydrochloric acid.

Other than these, solutions of ammonium salts of these acids are also usable.

As the etching solution usable for etching a member comprised of Ni as the non-alloyable metal (that is, the metal incapable of being alloyed with lithium), there can be mentioned solutions of dilute acids such as nitric acid.

As the etching solution usable for etching a member comprised of Cu as the non-alloyable metal, there can be mentioned solutions of one or more acids selected from sulfuric acid, hydrochloric acid, nitric acid and acetic acid. Other than these, a solution of cupric chloride or ferric chloride and aqueous ammonia are also usable.

As the etching solution usable for etching a member comprised of Ti as the non-alloyable metal, there can be mentioned solutions of one or more acids selected from hydrofluoric acid and phosphoric acid.

In any case wherein the chemical etching is conducted, it is desired to selectively use an appropriate etching solution having a selectively etching property such that that the etching rate for the alloyable metal (the metal capable of being alloyed with lithium) is different from that for the non-alloyable metal (the metal incapable of being alloyed with lithium).

The electrochemical etching is conducted in a manner wherein an electric field is applied between an object to be treated and a counter electrode in an electrolyte solution to electrochemically release metal ions from the object into the electrolyte solution.

As the electrolyte solution usable for electrochemically etching an Al-member, there can be used a solution of phosphoric acid, sulfuric acid or chromic acid. Other than these, solutions of mixtures of these acids are also usable.

As the electrolyte solution usable for electrochemically etching a Cu-member, there can be used a solution of phosphoric acid or the like.

The plasma etching is conducted in a manner wherein a plasma is generated from an etching gas to produce reactive ions or radicals, wherein an object to be treated is reacted with said reactive ions or radicals thereby etching said object.

As the usable etching gas, there can be mentioned tetrachloromethane, tetrafluoromethane, chlorine gas, trichloromonofluoromethane, dichlorodifluoromethane, and chlorotrifluoromethane.

Description will be made of the surface coating for the anode in the present invention.

As previously described, in the present invention, it is possible for the surface of the anode to be covered by an insulating film or a semiconductor film having a property of allowing lithium ion to pass through but prohibiting a lithium metal deposited upon the charging to pass through In this case, there are provided advantages such that lithium deposited is prevented from directly contacting with the electrolyte solution, active lithium is prevented from reacting to produce such a reaction product of not contributing to the charging, and as a result, the charging and discharging cycle life is prolonged. Further, in this case, when the anode is formed of a powdery material, the foregoing surface coat prevents occurrence of a removal at the surface of the anode.

As the material by which the surface of the anode is coated, there is used a material having a porous structure or a molecular structure capable of allowing lithium ion to pass through. As the material having such molecular structure, there can be mentioned high-molecular compounds such as large-ring ether structure-bearing compounds, cupulate cyclic compounds having a plurality of phenol units, and ether bond-bearing high-molecular compounds.

As for the material having such porous structure, it can be formed by a manner wherein an appropriate material such as an electrolyte salt or the like capable of being eluted after the formation of a coating film is contained in a coating liquid to be applied or a manner wherein a foaming agent or a material capable of being readily thermally decomposed is contained in a coating liquid to be applied.

Description will be made of the anode terminal in the present invention.

As previously described, the anode terminal for outputting or inputting a power is extended from the collector portion of the anode. The formation of the anode terminal may be conducted by a manner of electrically connecting an electrically conductive material to the collector portion by means of laser welding, spot welding or solder jointing. In the case where a collector portion is interposed between two members, it is desired to previously form a outputting portion capable of being electrically connected to a power outputting or inputting terminal at the collector portion.

CATHODE

The cathode is constituted by a cathode collector, a cathode active material, an electrically conductive auxiliary, and a binding agent. Particularly, the cathode is formed by disposing a mixture of a cathode active material, an electrically conductive auxiliary and a binding agent on a member capable of serving as a cathode collector.

The electrically conductive auxiliary can include carbon blacks such as KETJEN BLACK (trademark name) and acetylene black, and graphite in a powdery form or a fibrous form.

The binding agent is desired to be stable for the electrolyte solution. Specific examples of such binding agent are polytetrafluoroethylene, polyvinylidene fluoride, polyethylene, polypropylene, ethylene-propylene copolymer, and ethylene-propylene-diethane polymer.

The cathode collector serves to supply an electric current so that said electric current can be efficiently consumed for the electrode reaction upon conducting the charging and discharging cycle or it serves to collect an electric current generated. The cathode collector is therefore desired to be constituted by a material which has a high electrical conductivity and is inactive to the battery reaction. The material by which the cathode collector is constituted can include Ni, Ti, Cu, Al, Pt, V, Au, Zn, alloys of two or more of these metals such as stainless steel and the like.

The cathode collector member may be shaped in a plate-like form, foil-like form, mesh form, porous form-like sponge form, punching metal form, or expanded metal form.

As the cathode active material, there is usually used a compound selected from the group consisting of transition metal oxides and transition metal sulfides. The metals of these transition metal oxides and transition metal sulfides can include metals partially having a d-shell or f-shell. Specific examples of such metal are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. Of these, Ti, V, Cr, Mn, Fe, Co, Ni and Cu are most appropriate.

The cathode active material is desired to be comprised of any of the above transition metal oxides and transition metal sulfides which is incorporated with lithium. In the case where such lithium-containing cathode active material is used, there is provided an advantage in that it is not necessary to prepare a lithium-containing anode in advance and because of this, the battery production process can be simplified. The lithium-containing cathode active material may be prepared by a manner of obtaining a transition metal oxide or transition metal sulfide using lithium hydroxide or lithium salt. Alternatively, it may be prepared by a manner of providing a mixture of a given transition metal oxide or transition metal sulfide and lithium hydroxide, lithium nitrate, or lithium carbonate capable of being readily thermally decomposed and subjecting said mixture to heat treatment.

SEPARATOR

The separator is disposed between the anode and cathode, and it serves to prevent the cathode and anode from suffering from occurrence of internal-shorts between them. In addition, the separator also serves to retain the electrolyte solution.

The separator is required to have a porous structure capable of allowing lithium ion to pass therethrough and it is also required to be insoluble into and stable to the electrolyte solution.

The separator is usually constituted by a nonwoven fabric or a membrane having a micropore structure made of glass, polypropylene, polyethylene, fluorine-containing resin, or polyamide. Alternatively, the separator may be constituted by a metal oxide film or a resin film combined with a metal oxide, respectively having a plurality of pores. In a preferred embodiment, the separator is constituted by a multilayered metal oxide film. In this case, the separator effectively prevent a dendrite from passing therethrough and because of this, occurrence of internal-shorts between the cathode and anode is desirably prevented. In another preferred embodiment, the separator is constituted by an incombustible fluorine-containing resin, glass or metal oxide film. In this case, an improvement can be attained in terms of the safety.

ELECTROLYTE

In the present invention, there can be used an appropriate electrolyte as it is, a solution of said electrolyte dissolved in a solvent, or a material of said solution immobilized by using a gelatinizing agent However, an electrolyte solution obtained by dissolving an appropriate electrolyte in an solvent is usually used in a way that said electrolyte solution is retained on the separator.

The higher the electrical conductivity of the electrolyte, the better. Particularly, it is desired to use such an electrolyte or an electrolyte solution that the electrical conductivity at 25° C. is preferably $1 \times 10^{-3}$ S/cm or more or more preferably, $5 \times 10^{-3}$ S/cm or more.

The electrolyte usable in the present invention can include inorganic acids such as $H_2SO_4$, HCl and $HNO_3$; salts of $Li^+$ (lithium ion) with Lewis acid ion such as $BF_4^-$, $PF_6^-$, $ClO_4^-$, $CF_3SO_3^-$, or $BPh_4^-$ (with Ph being a phenyl group); and mixtures of two or more of said salts.

Other than these supporting electrolytes, salts of the above described Lewis acids ions with cations such as sodium ion, potassium ion, tetraalkylammonium ion, or the like are also usable.

In any case, it is desired that the above salts are used after they are subjected to dehydration or deoxygenation, for example, by way of heat treatment under reduced pressure.

The solvent in which the electrolyte is dissolved can include acetonitrile, benzonitrile, propylene carbonate, ethylene carbonate, dimethyl carbonate, diethyl carbonate, demethylformamide, tetrahydrofuran, nitrobenzene, dichloroethane, diethoxyethane, 1,2-dimethoxyethane, chlorobenzene, γ-butyrolactone, dioxolan, sulfolan, nitrometane, dimethyl sulfide, dimethyl oxide, methyl formats, 3-methyl-2-oxdazolydinone, 2-methyltetrahydrofuran, 3-propylsydonone, sulfur dioxide, phosphoryl chloride, thionyl chloride, sulfuryl chloride, and mixtures of two or more of these.

As for these solvents, it is desired for them to be subjected to dehydration using activated alumina, molecular sieve, phosphorous pentaoxide, or calcium chloride, prior to their use. Alternatively, it is possible for them to be subjected to distillation in an atmosphere composed of inert gas in the presence of an alkali metal, wherein moisture and foreign matters are removed.

In order to prevent leakage of the electrolyte, it is desired for the electrolyte to be gelatinized using an appropriate gelatinizing agent.

The gelatinizing agent usable in this case can include polymers having a property such that it absorbs the solvent of the electrolyte solution to swell.

Specific examples of such polymer are polyethylene oxide, polyvinyl alcohol, and polyacrylamide.

SHAPE AND STRUCTURE OF SECONDARY LITHIUM CELL

There is no particular limitation for the shape of the rechargeable lithium battery according to the present invention.

The rechargeable lithium battery according to the present invention may be in the form of a flat round shape (or a coin-like shape), a cylindrical shape, a prismatic shape, or a sheet-like shape. In the case where the rechargeable lithium battery is shaped in a spiral-wound cylindrical form, the anode, separator and cathode are arranged in the named order and they are spriral-wound. By this, there are provided advantages such that the battery area can be increased as desired and a high electric current can be flown upon conducting the charging and discharging cycle. In the case where the rechargeable lithium battery is shaped in a prismatic form, there is provided an advantage in that the space of a device for housing the rechargeable lithium battery can be effectively utilized.

As for the structure of the rechargeable lithium battery according to the present invention, it can optionally made to be of a single layer structure or a stacked structure.

Figure 6:
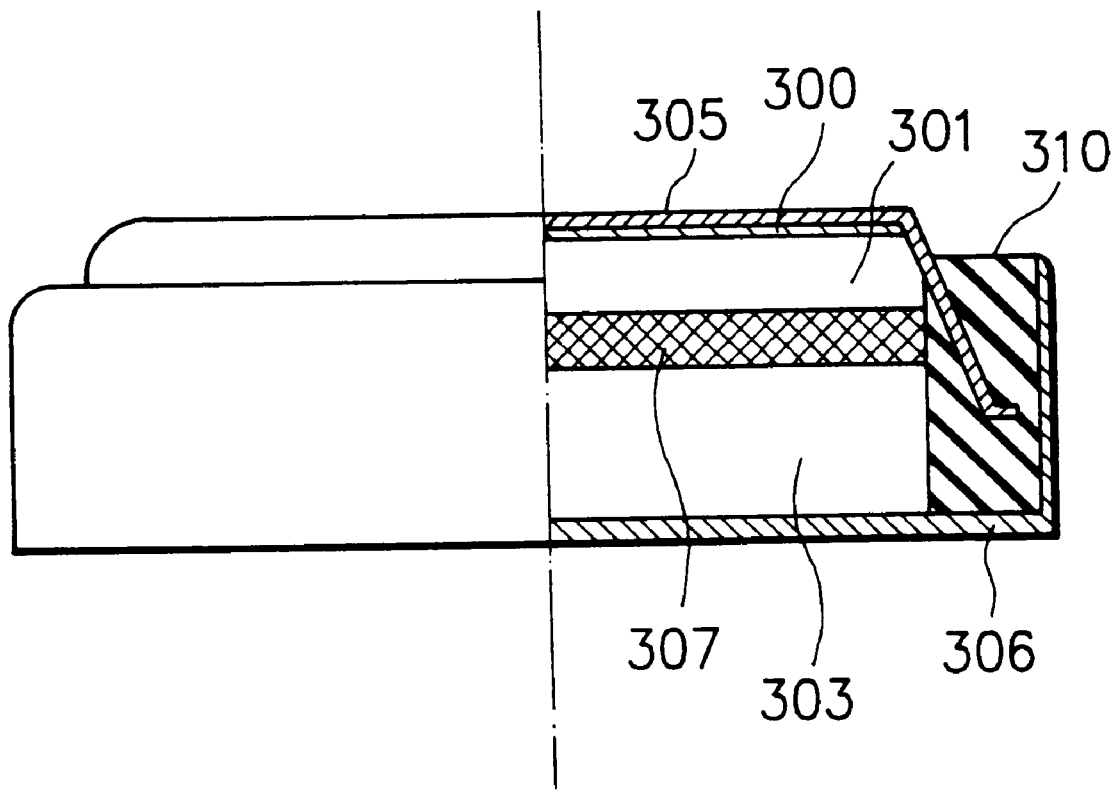
FIG. 6 is a schematic cross-sectional view illustrating a single-layer system flat rechargeable battery.
Figure 7:
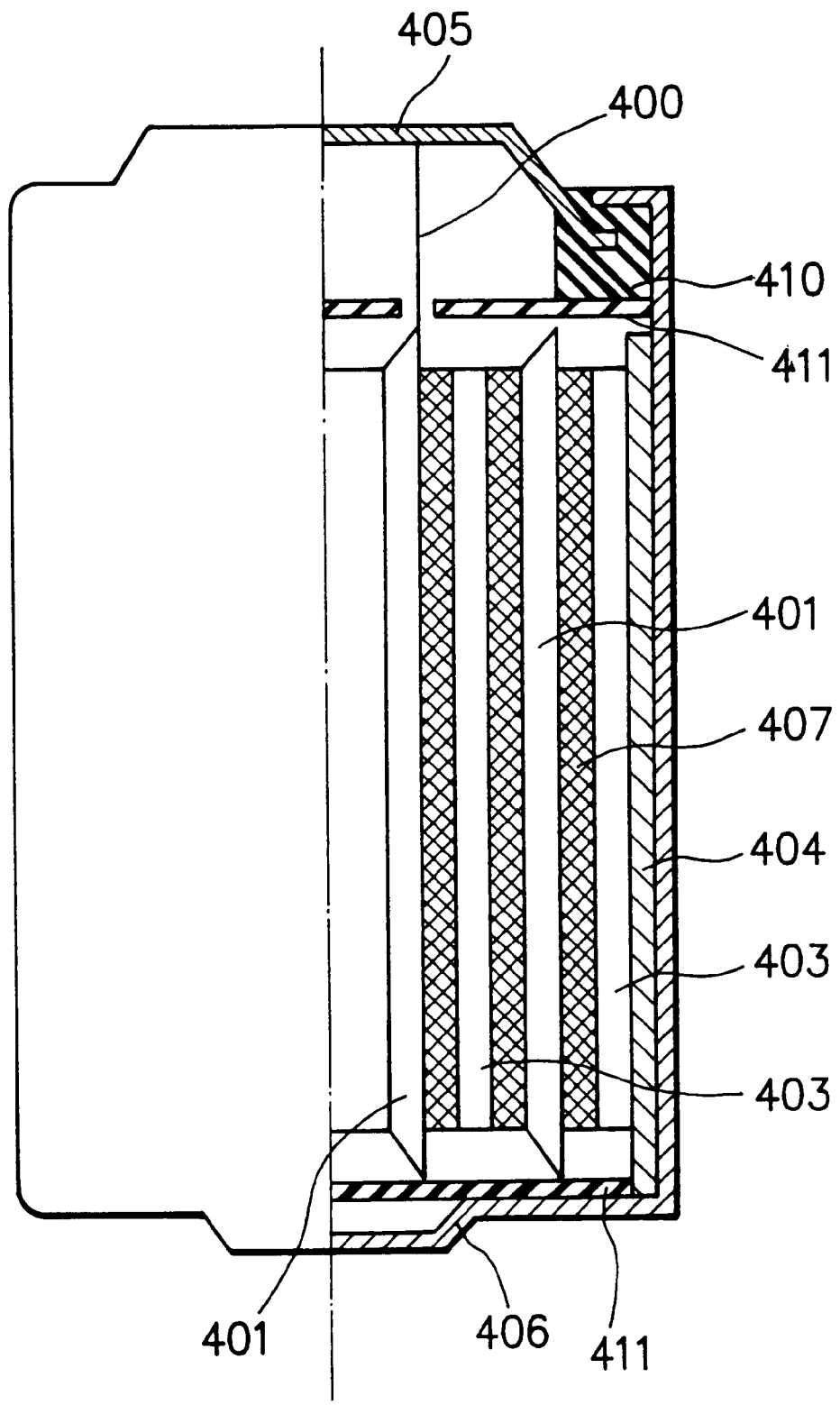
FIG. 7 is a schematic cross-sectional view illustrating a spiral-wound cylindrical rechargeable battery.

FIG. 6 is a schematic cross-sectional view illustrating an example of a single-layer structure type flat rechargeable lithium battery according to the present invention. FIG. 7 is a schematic cross-sectional view illustrating an example of a spiral-wound cylindrical rechargeable lithium battery according to the present invention.

In FIGS. 6 and 7, each of reference numerals 300 and 400 indicates an anode collector, each of reference numerals 301 and 401 an anode, each of reference numerals 303 and 403 a cathode, each of reference numerals 305 and 405 an anode terminal (or an anode cap), each of reference numerals 306 and 406 a cathode can, each of reference numerals 307 and 407 a separator and an electrolyte, each of reference numerals 310 and 410 an insulating packing, and reference numeral 411 an insulating plate.

The fabrication of a rechargeable battery of the configuration shown in FIG. 6 or FIG. 7 is conducted, for example, in the following manner. That is, a combination comprising the separator (307, 407) interposed between the anode (301, 401) and the cathode (303, 403) is positioned in the cathode can (306, 406). Thereafter, the electrolyte is introduced thereinto. The resultant is assembled with the anode cap (305, 405) and the insulating packing (310, 410), followed by subjecting to caulking treatment. Thus, there is obtained the rechargeable battery.

The preparation of the constituent materials for the rechargeable battery and the fabrication of the rechargeable battery are desired to be conducted in a dry air atmosphere free of moisture or a dry inert gas atmosphere free of moisture.

As the constituent of the insulating packing (310, 410), there can be used fluorine-containing resin, polyamide resin, polysulfone resin, or various rubbers.

The sealing is typically conducted using a gasket such as the insulating packing, as shown in FIGS. 6 and 7. Other than this, it can be conducted by means of glass sealing, adhesive sealing, welding or soldering.

As the constituent of the insulating plate 411 shown in FIG. 7, there can be used organic resins and ceramics.

Any of the cathode can (306, 406) and the anode cap (305, 405) can be constituted by stainless steel, titanium clad steel, copper clad steel, or nickel-plated steel.

In any of the configurations shown in FIGS. 6 and 7, the cathode can (306, 406) is designed to serve also as a battery casing In the case where a battery casing is independently used, the battery casing can be constituted by a metal such as zinc, an alloy such as stainless steel, a plastic such as polypropylene, or a composite of a metal or glass fiber with plastic.

Although this is not shown in any of FIGS. 6 and 7, but it is possible to employ an appropriate safety valve in any of the configurations shown in FIGS. 6 and 7.

In the following, the present invention will be described in more detail with reference to examples, which are only for illustrative purposes but not intended to restrict the scope of the present invention to these examples.

EXAMPLE 1

There was prepared a rechargeable lithium battery of the configuration shown in FIG. 6 in the following manner.
Formation of anode:

There was firstly provided a foil composed of a Ti-Al alloy containing the Ti in an amount of 50% and the Al in an amount of 50% (the Ti belonging to the metal incapable of being alloyed with lithium). The Ti-Al alloy was subjected to surface polishing treatment to obtain a 50 um thick Ti-Al alloy foil having a ground surface.

The Ti-Al alloy foil was then immersed in a 5% potassium hydroxide aqueous solution for 5 minutes, wherein the surface of the Ti-Al alloy foil was etched. The Ti-Al alloy foil thus treated was washed with pure water, followed by drying. Thus, there was obtained an anode.

In the above, as for the surface of the Ti-Al alloy foil to be opposed to a cathode, its surface roughness measured by the tracer method was adjusted to be 0.6 $\mu$m or less in central line average roughness and 3.8 $\mu$m or less in maximum height Rmax through the surface polishing treatment and the etching treatment, wherein the number of roughened peaks for the measured length L of 80 $\mu$m was 7.

Formation of Cathode

Electrolytic manganese dioxide was mixed with lithium carbonate with a mixing ratio of 1:0.4, followed by subjecting heat treatment at 800° C., to there by obtain a lithium-manganese oxide. With the resultant lithium-manganese oxide, 3 wt. % of powdery acetylene black and 5 wt. % of powdery polyvinylidene fluoride were mixed. The resultant was mixed with N-methyl-2-pyrrolidone to obtain a paste-like product.

The resultant paste-like product was applied onto the surface of an aluminum foil, followed by subjecting to drying. Thus, there was obtained a cathode.

Preparation of Electrolyte Solution

There was provided a moisture-free mixed solvent composed of ethylene carbonate (EC) and methoxy carbonate (DMC) with an equivalent mixing ratio. 1 m (mol/l) of tetrafluoro lithium borate was dissolved in the mixed solvent. Thus, there was obtained an electrolyte solution.

Formation of Separator

A nonwoven fabric made of polypropylene, a polypropylene membrane film provided with a number of small pores, and another nonwoven fabric made of polypropylene were laminated in the named order to obtain a composite having a thickness of 50 $\mu$m. Thus, there was obtained a separator.

Fabrication of Rechargeable Lithium Battery

The fabrication of a rechargeable lithium battery was conducted in a dry argon atmosphere. The separator was interposed between the cathode and the anode, and the resultant was inserted into a cathode can made of titanium clad steel. Then, the electrolyte solution was injected into the cathode can. The resultant was sealed using an anode cap made of titanium clad steel and an insulating packing made of fluoro rubber. Thus, there was obtained a rechargeable lithium battery.

EXAMPLE 2

There was prepared a rechargeable lithium battery of the configuration shown in FIG. 6 in the same manner as in Example 1, except that the anode was formed in the following manner, and as the separator, a 25 μm thick polypropylene membrane film provided with a number of small pores was used.

The anode was formed in the following manner. That is, there was firstly provided a 30 μm thick aluminum foil. The aluminum foil was immersed in a 5% potassium hydroxide aqueous solution for 5 minutes, wherein the surface of the aluminum foil was etched. The aluminum foil thus treated was washed with pure water, followed by drying. The resultant aluminum foil was then immersed in a 20% nickel chloride aqueous solution maintained at 50° C. for 5 minutes, whereby the opposite surfaces of the aluminum foil were partially substituted by nickel (belonging to the metal incapable of being alloyed with lithium). The aluminum foil thus treated was washed with pure water, followed by subjecting to vacuum drying at 150° C. In this case, as for the surface of the aluminum foil to be opposed to the cathode, its surface roughness measured by the tracer method was adjusted to be 0.4 μm or less in central line average roughness and 2.0 μm or less in maximum height Rmax, wherein the number of roughened peaks for the measured length L of 80 μm was 8.

EXAMPLE 3

There was prepared a rechargeable lithium battery of the configuration shown in FIG. 6 in the same manner as in Example 2, except that the treated face of the aluminum foil on the current collecting side was applied with an electrically conductive ink obtained by fine particles of Ag were dispersed in an epoxy resin of −30° C. in glass transition temperature by means of the screen printing process, followed by subjecting to heat treatment at 150° C. and under reduced pressure condition to crosslink and harden, thereby forming an electrically conductive layer on said face.

EXAMPLE 4

There was prepared a rechargeable lithium battery of the configuration shown in FIG. 6 in the same manner as in Example 1, except that the anode was formed in the following manner.

That is, there was firstly provided a 30 um thick aluminum foil having a ground surface. The aluminum foil was immersed in a 5% hydrofluoric acid aqueous solution for 5 minutes, wherein the surface of the aluminum foil was etched. The aluminum foil thus treated was washed with pure water, followed by drying. The resultant aluminum foil was then immersed in an aqueous solution containing copper sulfate and sulfuric acid, wherein the opposite surfaces of the aluminum foil were copper-plated at a thickness of 50 nm (the copper belonging to the metal incapable of being alloyed with lithium). The aluminum foil thus treated was washed with pure water, followed by subjecting to vacuum drying at 150° C. Then, the surface of the aluminum foil on the current collecting side was deposited with a Sn-Bi alloy at a thickness of 500 nm by means of the sputtering process to thereby form an electrically conductive layer. Thus, there was obtained an anode.

In this case, as for the surface of the aluminum foil to be opposed to the cathode, its surface roughness measured by the tracer method was adjusted to be 0.3 μm or less in central line average roughness and 1.7 μm or less in maximum height Rmax through the surface polishing treatment and the etching treatment wherein the number of roughened peaks for the measured length L of 80 μm was 8.

EXAMPLE 5

There was prepared a rechargeable lithium battery of the configuration shown in FIG. 6 in the same manner as in Example 1, except that the anode was formed in the following manner.

That is, powdery aluminum of 300 mesh in mean particle size, powdery polyvinylidene fluoride as a binding agent, acetylene black, and flake-like graphite were mixed with a mixing weight ratio of 89:5:3:3. The resultant mixture was mixed with N-methyl-2-pyrrolidone to obtain a paste-like product. The resultant paste-like product was applied on the surface of a Sn-plated copper foil of 35 μm in thickness. The thickness of the coat formed on the surface of the Sn-plated copper foil was made to be uniform by means of a roll press machine, followed by subjecting to vacuum drying at 150° C., to thereby obtain a 70 μm thick anode.

EXAMPLE 6

There was prepared a rechargeable lithium battery of the configuration shown in FIG. 6 in the same manner as in Example 1, except that the anode was formed in the following manner.

That is, powdery aluminum of 300 mesh in mean particle size, ultra fine powdery nickel of less than 0.1 in mean particle size, and methyl cellulose as a binding agent were mixed with a weight mixing ratio of 90:5:5. The resultant mixture was mixed with xylene to obtain a paste-like product. The resultant paste-like product was applied on the surface of a nickel-plated iron punching metal foil of 35 um in thickness. The thickness of the coat formed on the surface of the foil was made to be uniform by means of a roll press machine, followed by subjecting to drying at 100° C. The resultant was subjected to sintering treatment at 700° C. under reduced pressure condition.

Thereafter, the resultant obtained was immersed in a 20% nickel chloride aqueous solution maintained at 50° C. for 5 minutes, wherein the powdery aluminum of the coat formed on the foil was partially substituted by nickel, followed by subjecting to washing with pure water, then followed by subjecting to vacuum drying at 150° C., to thereby obtain a 60 μm thick anode.

EXAMPLE 7

There was prepared a rechargeable lithium battery of the configuration shown in FIG. 6 in the same manner as in Example 1, except that the anode was formed in the following manner.

That is, powdery Ni-Al alloy (with a mixing rate of 40%:60%) having a mean particle size of 250 mesh and methyl cellulose as a binding agent were mixed with a weight mixing ratio of 90:10. The resultant mixture was mixed with xylene to obtain a paste-like product. The resultant paste-like product was applied on the surface of a expanded nickel metal foil of 35 μm in thickness. The thickness of the coat formed on the surface of the foil was made to be uniform by means of a roll press machine, followed by subjecting to drying at 100° C. The resultant was subjected to sintering treatment at 700° C. under reduced pressure.

Thereafter, the resultant obtained was immersed in a 5% potassium hydroxide aqueous solution for 5 minutes, wherein the surface of the coat formed on the foil was etched, followed by subjecting to washing with pure water, then followed by subjecting to vacuum drying at 150° C., to thereby obtain a 50 μm thick anode.

EXAMPLE 8

There was prepared a rechargeable lithium battery of the configuration shown in FIG. 6 in the same manner as in Example 1, except that the anode was formed in the following manner.

That is, powdery Li-Al alloy (with a mixing rate of 50%:50%) having a mean particle size of 300 mesh, powdery magnesium of 150 mesh in mean particle size, and acetyl cellulose as a binding agent were mixed with a weight mixing ratio of 45:45:10. The resultant mixture was mixed with xylene to obtain a paste-like product. The resultant paste-like product was applied on the surface of a expanded nickel metal foil of 35 μm in thickness. The thickness of the coat formed on the surface of the foil was made to be uniform by means of a roll press machine, followed by subjecting to drying at 100° C. The resultant was subjected to sintering treatment at 700° C. under reduced pressure.

Thereafter, the resultant obtained was immersed in a 5% potassium hydroxide aqueous solution for 5 minutes, wherein the surface of the coat formed on the foil was etched, followed by subjecting to washing with pure water, then followed by subjecting to vacuum drying at 150° C., to thereby obtain a 60 μm thick anode.

EXAMPLE 9

There was prepared a rechargeable lithium battery of the configuration shown in FIG. 6 in the same manner as in Example 1, except that the anode was formed in the following manner.

That is, a solution of a copolymer of tetrafluoroethylene and vinyl ether (trademark name: SUPER KONAC F, produced by Nihon Ushi Kabushiki Kaisha) dissolved in xylene was mixed with a solution of dimethyl carbonate containing lithium borofluoride in an amount of 1 wt. % to obtain a coating liquid for the formation of a surface coat. The coating liquid was applied on the surface of an aluminum foil having subjected to surface treatment in the same manner as in Example 4 to be opposed to the cathode by means of a spinner, followed by subjecting to heat treatment at 170° C. under reduced pressure, to thereby dry and harden the coat formed on the foil. Then, the hardened coat was irradiated with ultraviolet rays, to thereby obtain an anode having a coating film having a property of allowing lithium ion to pass through on the surface thereof.

COMPARATIVE EXAMPLE 1

There was prepared a rechargeable lithium battery of the configuration shown in FIG. 6 in the same manner as in Example 1, except that the anode was replaced by a conventional aluminum foil of 30 μm in thickness.

As for the surface of the aluminum foil to be opposed to the cathode, its surface roughness measured by the tracer method was found to be 0.15 μm or less in central line average roughness and 0.7 μm or less in maximum height Rmax, wherein the number of roughened peaks for the measured length L of 80 μm was found to be 6.

COMPARATIVE EXAMPLE 2

There was prepared a rechargeable lithium battery of the configuration shown in FIG. 6 in the same manner as in Example 1, except that the anode was replaced by a 100 μm thick aluminum foil having an etched surface (produced by Nihon Chikudenki Kogyo Kabushiki Kaisha).

COMPARATIVE EXAMPLE 3

There was prepared a rechargeable lithium battery of the configuration shown in FIG. 6 in the same manner as in Example 1, except that the anode was formed in the following manner.

That is, powdery graphite obtained by subjecting natural powdery graphite to heat treatment in an argon gas atmosphere at 2000° C., acetylene black, and powdery polyvinylidene fluoride were mixed with a weight mixing ratio of 82:3:5. The resultant mixture was mixed with N-methyl-2-pyrrolidone to obtain a paste-like product. The resultant paste-like product was applied on the surface of a copper foil of 35 μm in thickness. The thickness of the coat formed on the surface of the foil was made to be uniform by means of a roll press machine, followed by subjecting to drying at 150° C. under reduced pressure. Thus, there was obtained a 110 μm thick anode.

Evaluation

As for each of the rechargeable lithium batteries obtained in the above Examples 1 to 9 and the above Comparative Examples 1 to 3, evaluation was conducted with respect to battery characteristics through the charging and discharging cycle test.

The charging and discharging cycle test was conducted in the following manner. That is, each rechargeable lithium battery was placed in a charging and discharging device HJ-106M (produced by Hokuto Danko Kabushiki Kaisha), wherein charging and discharging were alternately repeated under conditions of 0.5 C (electric current of 0.5 time the electric capacity per an hour based on the electric capacity calculated from the anode active material of each rechargeable lithium battery) for the charging and discharging, 4.5 V for the cut-off voltage upon the charging, 30 minutes for the rest, and 2.5 V for the cutoff voltage upon the discharging.

The cut-off voltage upon the charging was determined so as to prevent the solvent of the electrolyte solution from decomposing.

The charging and discharging cycle test was initiated by operating the charging.

In the charging and discharging test, as for each rechargeable lithium battery, there were observed its battery capacity. (that is, an energy density, namely, a discharge energy density) per unit volume of the rechargeable lithium battery) and its charging and discharging cycle life. The battery capacity was based on the service capacity after the third repetition of the charging and discharging cycle. And the charging and discharging cycle life was based on the number of the charging and discharging cycle having been repeated until the charge voltage became 4.5 V.

The observed results obtained are collectively shown in Table 1. Xn Table 1, the values with respect to the energy density as for the rechargeable lithium batteries obtained in Examples 1 to 9 and Comparative Examples 2 and 3 are relative values to the energy density of the rechargeable lithium battery obtained in Comparative Example 1, which is set at 1.0. Similarly, the values with respect to the cycle life as for the rechargeable lithium batteries obtained in Examples 1 to 9 and Comparative Examples 2 and 3 are relative values to the cycle life of the rechargeable lithium battery obtained in Comparative Example 1, which is set at 1.0.

Based on the results shown in Table 1, there were obtained the following facts. That is, the rechargeable lithium batteries obtained in Examples 1 to 9 belonging to the present invention are surpassing the rechargeable lithium batteries obtained in Comparative Examples 1 to 3 in terms of the total battery characteristics. Particularly, as for the energy density, the rechargeable lithium batteries obtained in Examples 1 to 9 are apparently superior to the rechargeable lithium batteries obtained in Comparative Examples 1 to 3. As for the charging and discharging cycle life, the rechargeable lithium batteries obtained in Examples 1 to 9 are apparently superior to the rechargeable lithium batteries obtained in Comparative Examples 1 and 2, although the rechargeable lithium batteries obtained in Examples 1 to 9 are similar to the rechargeable lithium battery obtained in Comparative Example 3 which is, however, apparently inferior in terms of the energy density.

TABLE 1

|  | discharge energy density | charging and discharging cycle life |
|---|---|---|
| the rechargeable lithium battery in Example 1 | 1.4 | 2.9 |
| the rechargeable lithium battery in Example 2 | 1.6 | 3.2 |
| the rechargeable lithium battery in Example 3 | 1.5 | 3.7 |
| the rechargeable lithium battery in Example 4 | 1.6 | 3.5 |
| the rechargeable lithium battery in Example 5 | 1.3 | 3.3 |
| the rechargeable lithium battery in Example 6 | 1.4 | 3.6 |
| the rechargeable lithium battery in Example 7 | 1.4 | 3.4 |
| the rechargeable lithium battery in Example 8 | 1.4 | 3.6 |
| the rechargeable lithium battery in Example 9 | 1.6 | 3.9 |
| the rechargeable lithium battery in Comparative Example 1 | 1.0 | 1.0 |
| the rechargeable lithium battery in Comparative Example 2 | 1.1 | 1.3 |
| the rechargeable lithium battery in Comparative Example 3 | 1.0 | 4.2 |

What is claimed is:

1. In a rechargeable lithium battery containing an anode, the improvement which comprises:
   an anode comprising (a) a collector comprising a first metal incapable of being alloyed with lithium which is generated upon operating charging, and (b) a layer on said collector, comprising said first metal incapable of being alloyed with lithium which is generated upon operating charging and a second metal capable of being alloyed with lithium which is generated upon operating charging,
   wherein said first metal is selected from the group consisting of at least one of Ni, Ti, Cu, Ag, Au, Pt, Fe, Co, Cr, W and Mo, and said second metal is selected from the group consisting of at least one of Al, Mg, K, Na, Ca, Sr, Ba, Si, Ge, Sb, Pb, In and Zn and
   wherein said anode does not contain lithium prior to initial operating charging.

2. In a rechargeable lithium battery according to claim 1, a surface region in the layer (b) that is in contact with an electrolyte, is opposed to a cathode, and has a portion adjacent to the collector that is connected to an anode terminal, said surface region and said portion consisting essentially of said first metal incapable of being alloyed with lithium.

3. In a rechargeable lithium battery according to claim 1, wherein the anode has a member containing said first metal in a powdery form and the collector comprises a collector member comprising the metal (i) and a constituent other than the metal incapable of being alloyed with lithium, wherein said member of the anode containing said first metal is fixed to said collector with a binding agent.

4. In a rechargeable lithium battery according to claim 1, wherein the anode comprises an alloy containing at least said first metal (i) and said second metal (ii).

5. In a rechargeable lithium battery according to claim 1, wherein the anode comprises a member containing said first metal (i) and other metal having an etching rate different from that of said first metal (i) and being capable of being selectively etched.

6. In a rechargeable lithium battery according to claim 1, wherein the anode has an increased surface area obtained by selectively etching said first metal contained in the collector.

7. In a rechargeable lithium battery according to claim 1, wherein the anode has a surface region in the layer (b) having surface irregularities, said surface region is contacted with an electrolyte and is opposed to a cathode is roughened such that a difference between a value corresponding to a ½ of the maximum height Rmax of the surface irregularities and a central line average roughness Ra is 1/10 or less of the distance between the anode and the cathode.

8. In a rechargeable lithium battery according to claim 1, wherein the anode has a surface having a roughness which satisfies the equation 1+ (4nRa/L)≧1.05, with Ra being central line average roughness, L being a length measured, and n being the number of peaks per the length L.

9. In a rechargeable lithium battery according to claim 1, wherein the anode has a collector portion provided with a electrically conductive layer having a coefficient of extension at room temperature which is greater than that of said first metal (i).

10. In a rechargeable lithium battery according to claim 9, wherein the electrically conductive layer comprises one or more materials selected from the group consisting of Sn-Bi alloy, Sn-Pb alloy, Zn-Al alloy, Cu-Zn alloy, Cd-Zn alloy, and an electrically conductive ink comprising electrically conductive particles fixed with a material substantially unreactive with an electrolyte or electrolyte solution, said material being selected from the group consisting of fluororesins, polyolefins, silicone resins, and highly crosslinkable high molecular weight materials.

11. In a rechargeable lithium battery according to claim 10, wherein the high-molecular material is selected from the group consisting of fluorine-containing resin, polyolefine, silicone resin, and other polymers capable of being highly crosslinked.

12. In a rechargeable lithium battery according to claim 1, wherein the rechargeable battery further comprises a cathode comprising a cathode active material which contains lithium.

13. In a rechargeable lithium battery according to claim 1, wherein the anode has a surface coating comprising an insulating film or a semiconductor film incapable of being dissolved in the electrolyte and having a property of allowing a lithium ion to pass through but prohibiting a lithium metal deposited upon the charging to pass through.

14. An anode for a rechargeable lithium battery, comprising: (a) a collector comprising a first metal incapable of being alloyed with lithium which is generated upon operating charging, and (b) a layer on said collector, comprising said first metal incapable of being alloyed with lithium which is generated upon operating charging and a second metal capable of being alloyed with lithium which is generated upon operating charging, wherein said first metal is selected from the group consisting of at least one of Ni, Ti, Cu, Ag, Au, Pt, Fe, Co, Cr, W and Mo, and said second metal is selected from the group consisting of at least one of Al, Mg, K, Na, Ca, Sr, Ba, Si, Ge, Sb, Pb, In and Zn; and wherein said anode does not contain lithium prior to initial operating charging.

15. An anode for a rechargeable lithium battery according to claim 14, wherein the anode has a surface region in the layer (b) which is contacted with an electrolyte and is opposed to a cathode and has a portion in the collector and which is connected to the anode terminal, said surface region and said portion consisting essentially of said first metal incapable of being alloyed with lithium.

16. An anode for a rechargeable lithium battery according to claim 14, wherein the anode has a member containing said first metal in a powdery form and the collector comprises a collector member comprised of said first metal and a constituent other than the metal incapable of being alloyed with lithium, wherein said member of the anode containing said second metal is fixed to said collector with a binding agent.

17. An anode for a rechargeable lithium battery according to claim 14, wherein the anode comprises an alloy containing at least said first metal (i) and said second the metal (ii).

18. An anode for a rechargeable lithium battery according to claim 14, wherein the anode comprises a member containing said first metal (i) and other metal having an etching rate different from that of said first metal (i) and being capable of being selectively etched.

19. An anode for a rechargeable lithium battery according to claim 14, wherein the anode has an increased surface area obtained by selectively etching said first metal contained in the collector.

20. An anode for a rechargeable lithium battery according to claim 14, wherein the anode has a surface region in the layer (b) having surface irregularities, said surface region is contacted with an electrolyte and is opposed to a cathode is roughened such that a difference between a value corresponding to a ½ of the maximum height Rmax of the surface irregularities and a central line average roughness Ra is 1/10 or less of the distance between the anode and the cathode.

21. An anode for a rechargeable lithium battery according to claim 14, wherein the cathode has a surface having a roughness which satisfies the equation $1+(4nRa/L) \geq 1.05$, with Ra being central line average roughness, L being a length measured, and n being the number of peaks per the length L.

22. An anode for a rechargeable lithium battery according to claim 14, wherein the anode has a collector portion provided with a electrically conductive layer having a coefficient of extension at room temperature which is greater than that of said first metal (i).

23. An anode for a rechargeable lithium battery according to claim 22, wherein the electrically conductive layer comprises one or more materials selected from the group consisting of Sn-Bi alloy, Sn-Pb alloy, Zn-Al alloy, Cu-Zn alloy, Cd-Zn alloy, and an electrically conductive ink comprising electrically conductive particles fixed with a material substantially unreactive with an electrolyte or electrolyte solution, said material selected from a group consisting of fluororesins, polyolefins, silicone resins and crosslinkable high molecular weight materials.

24. An anode for a rechargeable lithium battery according to claim 23, wherein the high-molecular weight material is selected from the group consisting of fluorine-containing resin, polyolefin, silicone resin, and other polymers capable of being crosslinked.

25. An anode for a rechargeable lithium battery according to claim 14, wherein the anode has a surface coating comprising an insulating film or a semiconductor film incapable of being dissolved in the electrolyte solution and having a property of allowing a lithium ion to pass through but prohibiting a lithium metal deposited upon the charging to pass through.

26. A rechargeable lithium battery comprising an anode, a separator, a cathode, an anode terminal, and an electrolyte or an electrolyte solution, said anode terminal and said electrolyte or electrolyte solution being electrically contacted with said anode, wherein said anode has a layer comprising an alloy comprising (a) a first metal capable of being alloyed with lithium which is generated upon operating charging and (b) a second metal incapable of being alloyed with lithium which is generated upon operating charging, wherein said first metal is selected from the group consisting of at least one of Al, Mg, K, Na, Ca, Sr, Ba, Si, Ge, Sb, Pb, In and Zn, said second metal is selected from the group consisting of at least one of Ni, Ti, Cu, Ag, Au, Pt, Fe, Co, Cr, W and Mo, and said metal, and the content ratio of said first metal is 50% or more; and wherein said anode does not contain lithium prior to initial operating charging.

27. An anode for a rechargeable battery, having a layer comprising an alloy comprising (a) a first metal capable of being alloyed with lithium which is generated upon operating charging and (b) a second metal incapable of being alloyed with lithium which is generated upon operating charging, wherein said first metal is selected from the group consisting of at least one of Al, Mg, K, Na, Ca, Sr, Ba, Si, Ge, Sb, Pb, In and Zn, said second metal is selected from the group consisting of at least one of Ni, Ti, Cu, Ag, Au, Pt, Fe, Co, Cr, W and Mo, and the content ratio of said first metal is 50% or more; and wherein said anode does not contain lithium prior to initial operating charging.

* * * * *

UNITED STATES PATENT AND TRADEMARK OFFICE
CERTIFICATE OF CORRECTION

PATENT NO. : 6,051,340

DATED : April 18, 2000

INVENTOR(S) : SOICHIRO KAWAKAMI ET AL.          Page 1 of 6

It is certified that error appears in the above-identified patent and that said Letters Patent is hereby corrected as shown below:

ON THE TITLE PAGE:

[56] References Cited, under FOREIGN PATENT DOCUMENTS

"5190171" should read --5-190171--;
"5234585" should read --5-234585--;
"93-190171 9/1993 Japan" should be deleted; and
  insert --6-116717 5/1994 Japan--.

COLUMN 1:

Line 19, "predicted" should read --predicted.--;
Line 31, "to" should be deleted;
Line 50, "potable" should read --portable--;
Line 55, "an" should read --a--;
Line 56, "a" should read --an--; and
Line 59, "is considered" should be deleted.

COLUMN 2:

Line 9,  "developed" should read --developed.--; and
Line 57, "performance" should read --performance.--.

COLUMN 3:

Line 18, "many" should read --many times--;
Line 49, "deteriorated" should read --deteriorated.--;
Line 51, "aode" should read --anode--; and
Line 53, "insulating housing" should read
         --battery casing--.

UNITED STATES PATENT AND TRADEMARK OFFICE
CERTIFICATE OF CORRECTION

PATENT NO. : 6,051,340

DATED : April 18, 2000

INVENTOR(S) : SOICHIRO KAWAKAMI ET AL.

It is certified that error appears in the above-identified patent and that said Letters Patent is hereby corrected as shown below:

COLUMN 4:

Line 1, "a" should be deleted.

COLUMN 5:

Line 5, "is occurred" should read --occurs--; and
Line 22, "present" (second occurrence) should be deleted.

COLUMN 6:

Line 60, "a" (second occurrence) should be deleted.

COLUMN 7:

Line 49, "a" should be deleted.

COLUMN 8:

Line 18, "mined" should read --mixed--;
Line 40, "having" should be deleted;
Line 51, "occur" should read --occurs--; and
Line 55, "are" should be deleted.

COLUMN 10:

Line 39, "a" should be deleted.

UNITED STATES PATENT AND TRADEMARK OFFICE
CERTIFICATE OF CORRECTION

PATENT NO.   : 6,051,340
DATED        : April 18, 2000
INVENTOR(S)  : SOICHIRO KAWAKAMI ET AL.            Page 3 of 6

It is certified that error appears in the above-identified patent and that said Letters Patent is hereby corrected as shown below:

COLUMN 11:

Line 1,  "of" (second occurrence) should be deleted; and
    Line 30, "lithium" should read --lithium.--.

COLUMN 12:

Line 39, "lithium" should read --lithium.--.

COLUMN 13:

Line 11, "material" should read --material,--; and
    Line 49, "of" should be deleted.

COLUMN 14:

Line 20, "can" should read --can be--;
    Line 45, "Cu," (second occurrence) should be deleted; and
    Line 58, "extensionthe" should read --extension--.

COLUMN 15:

Line 6,  "polyollefine," should read --polyolefin,--; and
    Line 23, "treatment" should read --treatment.--.

COLUMN 16:

Line 27, "through" should read --through.--.

UNITED STATES PATENT AND TRADEMARK OFFICE
CERTIFICATE OF CORRECTION

PATENT NO.   : 6,051,340
DATED        : April 18, 2000
INVENTOR(S)  : SOICHIRO KAWAKAMI ET AL.

It is certified that error appears in the above-identified patent and that said Letters Patent is hereby corrected as shown below:

COLUMN 17:

Line 63, "into" should read --in--.

COLUMN 18:

Line 6,  "prevent" should read --prevents--;
Line 17, "agent" should read --agent.--;
Line 43, "nitrometane," should read --nitromethane,--;
Line 44, "formats," should read --formate,--;
Line 54, "matters" should read --matter--; and
Line 58, "it absorbs" should read --they absorb--.

COLUMN 19:

Line 7,  "spriral-wound." should read --spiral-wound.--; and
Line 63, "casing" should read --casing.--.

COLUMN 20:

Line 1, "but" should be deleted.

COLUMN 21:

Line 39, "by" should read --by dispersing--; and "were" should be deleted; and
Line 40, "dispersed" should be deleted.

UNITED STATES PATENT AND TRADEMARK OFFICE
CERTIFICATE OF CORRECTION

PATENT NO.   : 6,051,340
DATED        : April 18, 2000
INVENTOR(S)  : SOICHIRO KAWAKAMI ET AL.

It is certified that error appears in the above-identified patent and that said Letters Patent is hereby corrected as shown below:

COLUMN 25:

Line 65, "Sb," should read --Sn,--.

COLUMN 26:

Line 10, "the metal (i)" should read
         --said first metal--;
Line 19, "(i)" should be deleted;
Line 20, "(i)" should be deleted;
Line 28, "cathode" should read --cathode,--;
Line 42, "metal (i)." should read --metal.--;
Line 48, "with a material substantially unre-" should
         read --with an organic polymer material.--;
Lines 49-52, lines 49-52 should be deleted;
Line 54, "high-molecular" should read
         --organic polymer--; and
Line 55, "polyolefine," should read --polyolefin,--.

COLUMN 27:

Line 13, "Sb," should read --Sn,--;
Line 32, "(i)" should be deleted; and
         "the metal (ii)." should read --metal.--;
Line 35, "(i)" should be deleted;
Line 36, "(i)" should be deleted;
Line 45, "cathode" should read --cathode,--; and
Line 47, "a" should be deleted.

UNITED STATES PATENT AND TRADEMARK OFFICE
CERTIFICATE OF CORRECTION

PATENT NO.    : 6,051,340
DATED         : April 18, 2000
INVENTOR(S)   : SOICHIRO KAWAKAMI ET AL.

It is certified that error appears in the above-identified patent and that said Letters Patent is hereby corrected as shown below:

COLUMN 28:

Line 3,  "metal (i)." should read --metal.--;
    Line 9,  "with a material sub-" should read
               --with an organic polymer material.--;
    Lines 10-13, lines 10-13 should be deleted;
    Line 15, "high-molecular weight" should read
               --organic polymer--;
    Line 22, "solution" should be deleted;
    Line 37, "Sb," should read --Sn,--;
    Line 39, "and said metal," should be deleted; and
    Line 50, "Sb," should read --Sn,--.

Signed and Sealed this

Twenty-second Day of May, 2001

Attest:

NICHOLAS P. GODICI

*Attesting Officer*    *Acting Director of the United States Patent and Trademark Office*